US011273758B2

(12) United States Patent
Wang

(10) Patent No.: US 11,273,758 B2
(45) Date of Patent: Mar. 15, 2022

(54) VEHICLE INTERIOR COMPONENT HAVING A COMPOSITE STRUCTURE

(71) Applicant: Shanghai Yanfeng Jinqiao Automotive Trim Systems Co. Ltd., Novi, MI (US)

(72) Inventor: Chun Wang, Shanghai (CN)

(73) Assignee: SHANGHAI YANFENG JINQIAO AUTOMOTIVE TRIM SYSTEMS CO. LTD., Novi, MI (US)

( * ) Notice: Subject to any disclaimer, the term of this patent is extended or adjusted under 35 U.S.C. 154(b) by 0 days.

(21) Appl. No.: 17/320,175

(22) Filed: May 13, 2021

(65) Prior Publication Data

US 2021/0284063 A1    Sep. 16, 2021

Related U.S. Application Data

(63) Continuation-in-part of application No. PCT/CN2019/117834, filed on Nov. 13, 2019.

(30) Foreign Application Priority Data

Nov. 14, 2018  (CN) .......................... 201811356630.7
Nov. 14, 2018  (CN) .......................... 201821877678.8

(51) Int. Cl.
    *B60Q 3/54*      (2017.01)
    *B60Q 3/74*      (2017.01)
    *F21V 9/40*      (2018.01)

(52) U.S. Cl.
    CPC .............. *B60Q 3/54* (2017.02); *B60Q 3/745* (2017.02); *F21V 9/40* (2018.02)

(58) Field of Classification Search
    CPC ... F21Y 2115/10; B60Q 2500/10; B60Q 3/54; F21W 2106/00; F21V 9/40
See application file for complete search history.

(56) References Cited

U.S. PATENT DOCUMENTS 8,303,147 B2   11/2012   Jeon
9,604,569 B1   3/2017    Salter et al.
(Continued)

FOREIGN PATENT DOCUMENTS

CN   2871308 Y    2/2007
CN   202966147 U  6/2013
(Continued)

OTHER PUBLICATIONS

International Search Report for PCT Application No. PCT/CN2019/117834, dated Jan. 23, 2020.

*Primary Examiner* — Robert J May
(74) *Attorney, Agent, or Firm* — Amin, Turocy & Watson, LLP

(57) ABSTRACT

A vehicle interior component comprising a cover with a surface providing a display region is disclosed. The component may comprise a composite layer/structure and light source to provide light at a first and a second visible color/wavelength. The composite layer may comprise light-transmissive segments with color and light-transmissive transparent/translucent segments; light at the first wavelength is transmitted through a first segment and transparent/translucent segment to present a first image/visual effect at the display region; light at the second wavelength is transmitted through a second segment and transparent/translucent segment to present a second image/visual effect at the display region; light at the first wavelength is obstructed by the second segment; light at the second wavelength is obstructed by the first segment; transparent/translucent segments transmit light at first and second wavelengths. The composite layer may comprise a multi-layer form on the cover.

20 Claims, 10 Drawing Sheets

(56) References Cited

U.S. PATENT DOCUMENTS

2008/0158510 A1    7/2008  Tant et al.
2009/0080208 A1    3/2009  Droste et al.
2016/0325674 A1  11/2016  Krull et al.

FOREIGN PATENT DOCUMENTS

| CN | 102198749 B | 10/2014 |
| CN | 207274074 U | 4/2018 |
| DE | 10309225 A1 | 9/2004 |
| WO | 2019113690 A1 | 6/2019 |

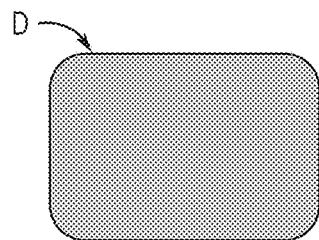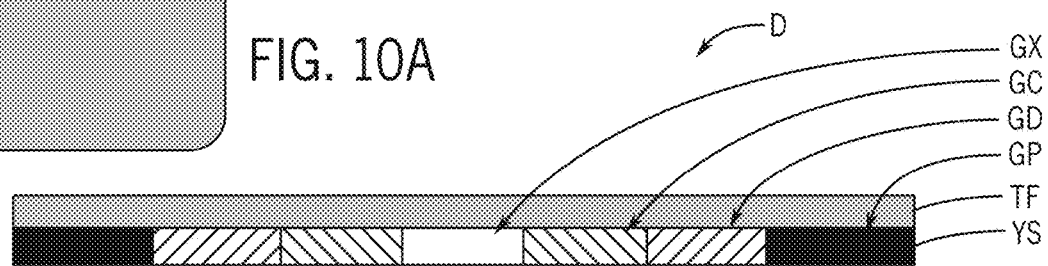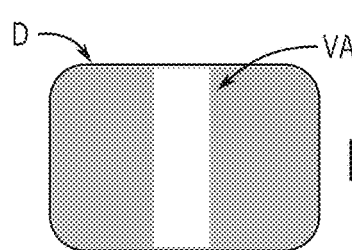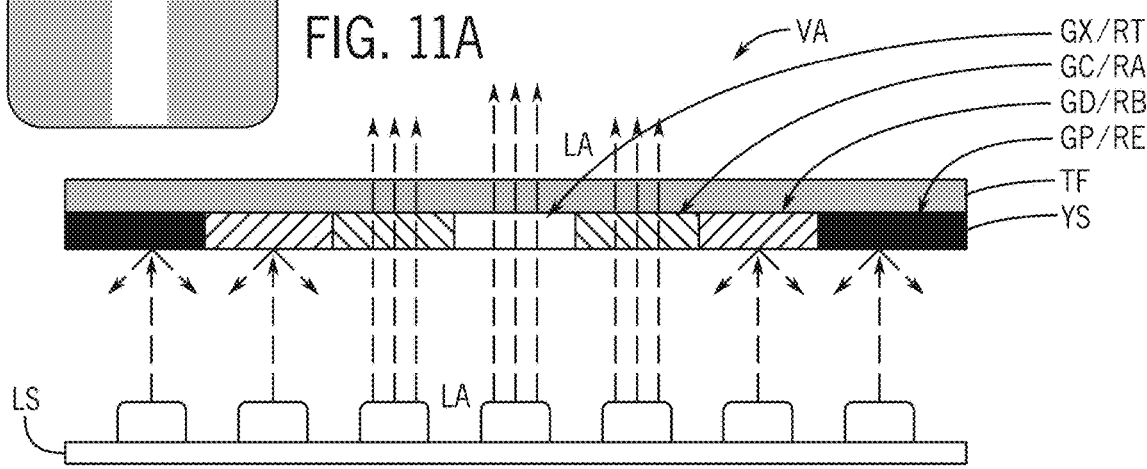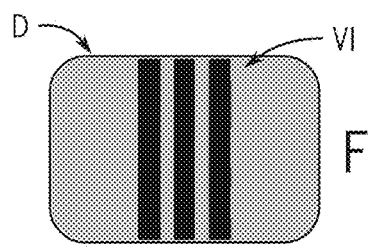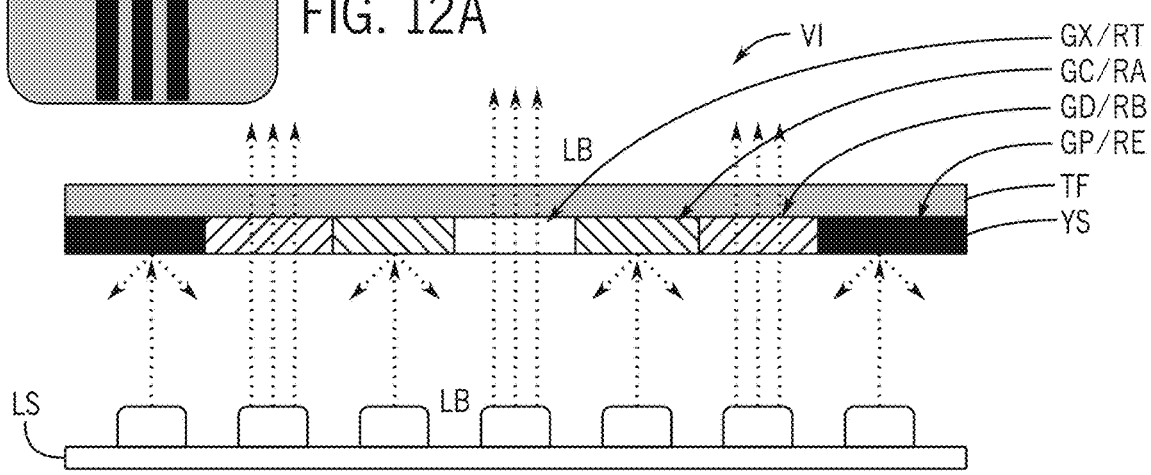

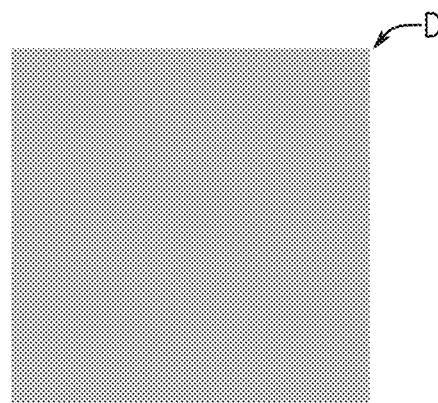
FIG. 19A

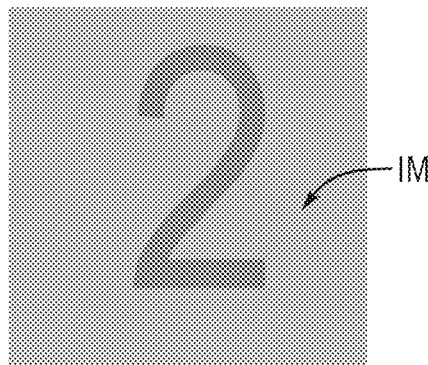 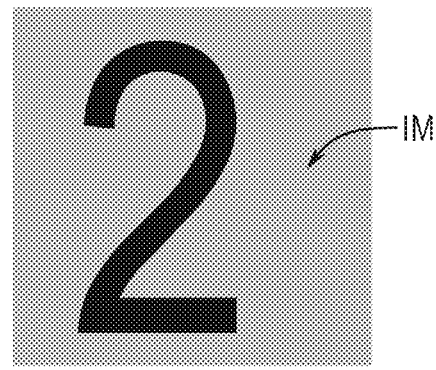
FIG. 19D  FIG. 19E
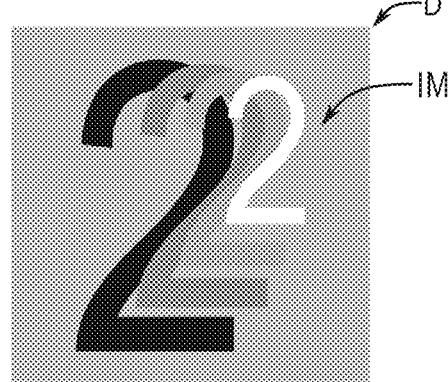
FIG. 19F

US 11,273,758 B2

VEHICLE INTERIOR COMPONENT HAVING A COMPOSITE STRUCTURE

CROSS-REFERENCE TO RELATED APPLICATIONS

The present application is a continuation-in-part of PCT/International Patent Application No. PCT/CN2019/117834 titled "VEHICLE INTERIOR TRIM PIECE" filed Nov. 13, 2019, which claims priority to Chinese Patent Application No. 201811356630.7 filed Nov. 14, 2018 and Chinese Utility Model Application No. 201821877678.8 filed Nov. 14, 2018 (now Chinese Utility Model No. CN209888780U).

The present application claims priority to and incorporates by reference in full the following patent applications: (a) Chinese Patent Application No. 201811356630.7 filed Nov. 14, 2018; (b) Chinese Utility Model Application No. 201821877678.8 filed Nov. 14, 2018 (now Chinese Utility Model No. CN209888780U); (c) PCT/International Patent Application No. PCT/CN2019/117834 titled "VEHICLE INTERIOR TRIM PIECE" filed Nov. 13, 2019.

FIELD

The present invention relates to a vehicle interior component.

The present invention also relates to a vehicle interior component providing a display region.

BACKGROUND

It is known to provide a vehicle interior component for a vehicle. It is also known to provide a display region within a vehicle interior component.

It would be advantageous to provide an improved vehicle interior component comprising a display region.

SUMMARY

The present invention relates to a vehicle interior component comprising a cover comprising an exterior surface and an underside, a composite layer on the underside of the cover, and a light source configured to provide light at a first visible color and light at a second visible color. The composite layer may comprise a first segment and a second segment and a transparent segment. The first segment and the second segment and the transparent segment may be light-transmissive. When light at the first visible color is provided by the light source a first image may be transmitted through the first segment and the transparent segment and presented at the exterior surface of the cover. When light at the second visible color is provided by the light source a second image may be transmitted through the second segment and the transparent segment and presented at the exterior surface of the cover. Light at the first visible color may comprise light at a first wavelength comprising a first visible color so that the first image is presented substantially in the first visible color; light at the second visible color may comprise light at a second wavelength comprising a second visible color so that the second image is presented substantially in the second visible color. Each transparent segment may comprise at least one of (a) a light-transmissive segment configured to transmit light at the first visible color and at the second visible color; (b) a light-transmissive segment with color configured to transmit light at the first visible color and at the second visible color; (c) a substantially clear segment; (d) a substantially colorless segment; (e) a substantially translucent light-transmissive segment.

The present invention relates to a vehicle interior component comprising a cover comprising an exterior surface and an underside, a composite layer on the underside of the cover, and a light source configured to provide light at a first visible color and light at a second visible color. The composite layer may comprise a first layer comprising a first segment and a second segment and a second layer comprising a first segment and a second segment. The first segment of the first layer and the first segment of the second layer may at least partially overlap in a first section. The second segment of the first layer and the second segment of the second layer may at least partially overlap in a second section. The first segment of the first layer and the second segment of the second layer may at least partially overlap in a third section. The first segment and the second segment of the first layer may be light-transmissive. The first segment and the second segment of the second layer may be light-transmissive. The first segment of the first layer may comprise a transparent segment; the second segment of the first layer may comprise a light-transmissive segment having a first color. The first segment of the second layer may comprise a light-transmissive segment having the second color; the second segment of the second layer may comprise a transparent segment. When light at the first visible color is provided by the light source a first image may be presented in the second section and the third section and transmitted to present the first image on the cover. When light at the second visible color is provided by the light source a second image may be presented in the first section and the third section and transmitted to present the second image on the cover. Light at the first visible color provided by the light source may be substantially obstructed by the first segment of the second layer of the composite layer; light at the second visible color provided by the light source may be substantially obstructed by the second segment of the first layer of the composite layer. The cover may comprise a display region; the composite structure may be configured so that the first image is presented in the display region of the cover when the light source transmits light in the first visible color and the second image is presented in the display region of the cover when the light source transmits light at the second visible color. The component may comprise a lining between the light source and the layer structure. Each transparent segment may comprise at least one of (a) a light-transmissive segment configured to transmit light at the first visible color and at the second visible color; (b) a light-transmissive segment with color configured to transmit light at the first visible color and at the second visible color; (c) a substantially clear segment; (d) a substantially colorless segment; (e) a substantially translucent light-transmissive segment.

The present invention relates to a vehicle interior component comprising a composite structure comprising a cover and a layer structure and a light source configured to provide light at a first wavelength and light at a second wavelength. The cover may comprise an exterior surface and an underside. The layer structure may comprise a first layer comprising a first segment and a second segment and a second layer comprising a first segment and a second segment. The first segment of the first layer and the first segment of the second layer may at least partially overlap in a first section of the layer structure. The second segment of the first layer and the second segment of the second layer may at least partially overlap in a second section of the layer structure. The first segment of the first layer and the second segment of the second layer may at least partially overlap in a third section of the layer structure. When light at the first wavelength is provided by the light source a first image may be transmitted through the second section and the third section of the layer structure and presented at the exterior surface of the cover. When light at the second wavelength is provided by the light source a second image may be transmitted through the first section and the third section of the layer structure and presented at the exterior surface of the cover. The first wavelength may comprise a first visible color so that the first image is presented substantially in the first visible color; the second wavelength may comprise a second visible color so that the second image is presented substantially in the second visible color. The exterior surface of the cover may comprise a display region; the layer structure may be configured so that the first image is presented in the display region of the cover when the light source transmits light at the first wavelength and the second image is presented in the display region of the cover when the light source transmits light at the second wavelength. The layer structure may comprise at least one of (a) a coating on an underside of the cover; (b) a film; (c) a two-layer coating; (d) a two-layer film. The second segment of the first layer may comprise a light-transmissive segment having a first color; the first segment of the first layer may comprise a transparent segment configured to transmit light to the cover at the first wavelength and at the second wavelength. The first segment of the second layer may comprise a light-transmissive segment having a second color; the second segment of the second layer may comprise a transparent segment configured to transmit light to the cover at the first wavelength and at the second wavelength. When light at the first visible color is provided by the light source a first image may be presented in the second section and the third section; when light at the second visible color is provided by the light source a second image may be presented in the first section and the third section. The first layer may comprise an opaque segment. The first layer of the layer structure may be provided on the underside of the cover and the second layer of the layer structure may be provided on the underside of the first layer of the layer structure. Each transparent segment may comprise at least one of (a) a light-transmissive segment configured to transmit light at the first visible color and at the second visible color; (b) a light-transmissive segment with color configured to transmit light at the first visible color and at the second visible color; (c) a substantially clear segment; (d) a substantially colorless segment; (e) a substantially translucent light-transmissive segment.

The present invention relates to a vehicle interior trim comprising a translucent surface layer and a pattern layer. The pattern layer may comprise multiple graphic areas characterized in that a graphic that corresponds to at least one graphic area among the multiple graphic areas will only be shown on a viewable surface of the vehicle interior trim when the vehicle interior trim is illuminated by visible backlight emitted by a light source. The graphic shown on the viewable surface of the vehicle interior trim may change in response to changes to a color of the visible light. The multiple graphic areas of the pattern layer may at least partially overlap to form an overlapping area. When the pattern layer is one layer, the overlapping area of the multiple graphic areas may be disposed to be colorless and transparent or translucent, other areas of the multiple graphic areas may only allow light corresponding to a color of the graphic area to pass through, and peripheral areas surrounding the multiple graphic areas may not allow the light to pass through. When the pattern layer is of multiple layers, the multiple graphic areas may be respectively located at different pattern layers, the multiple graphic areas may be disposed to be colorless and transparent or translucent, and peripheral areas of each of the pattern layers surrounding the multiple graphic areas may only allow light corresponding to a color of the peripheral area to pass through. A change of the graphic may comprise a change in a combination of any one or more of color, shape, dimension and position of the graphic. The visible light may be provided by one LED lamp or lamplight module that provides polychromatic visible light. The translucent surface layer may comprise any one or more materials of polyurethanes, polyvinyl chlorides, polystyrenes, polyolefins, polyester elastomers, polyamides, and silicone resins. The vehicle interior trim may comprise a base layer; at least a partial area of the base layer may comprise a transparent or translucent material, and the partial area covering the multiple graphic areas of the pattern layer. The at least partial area of the base layer may be connected to other areas of the base layer by any of insert injection molding, screws, welding, gluing and clamping. The visible light may be disposed to emit from beneath the base layer when the base layer is transparent or translucent, or at least the partial area of the base layer is transparent or translucent. The transparent or translucent material may comprise a combination of one or more of polycarbonate, polypropylene, polymethyl methacrylate, polystyrene, polyester and polysulfone. The pattern layer may comprise a combination of any one or more of transparent or translucent film, painting, ink, adhesive tape and adhesive film. The pattern layer may be formed by any one process of screen printing, hot stamping, spraying, and gluing.

FIGURES

FIG. 10A is a schematic partial plan view of a vehicle interior component according to an exemplary embodiment.

FIG. 10B is a schematic partial section view of a vehicle interior component according to an exemplary embodiment.

FIG. 11A is a schematic partial plan view of a vehicle interior component according to an exemplary embodiment.

FIG. 11B is a schematic partial section view of a vehicle interior component according to an exemplary embodiment.

FIG. 12A is a schematic partial plan view of a vehicle interior component according to an exemplary embodiment.

FIG. 12B is a schematic partial section view of a vehicle interior component according to an exemplary embodiment.

FIGS. 19A through 19F are schematic partial plan views of a vehicle interior component according to an exemplary embodiment.

DESCRIPTION

Figure 1A:
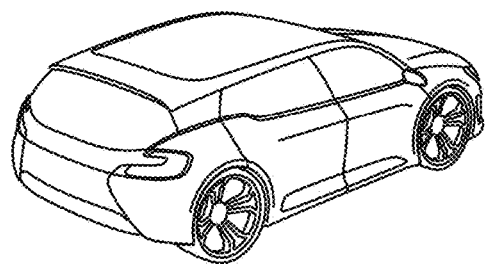
FIG. 1A is a schematic perspective view of a vehicle according to an exemplary embodiment.
Figure 1B:
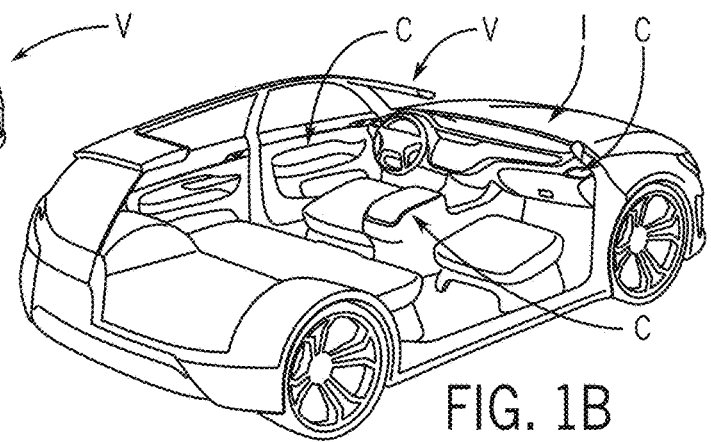
FIG. 1B is schematic partial perspective view of a vehicle interior according to an exemplary embodiment.
Figure 2:
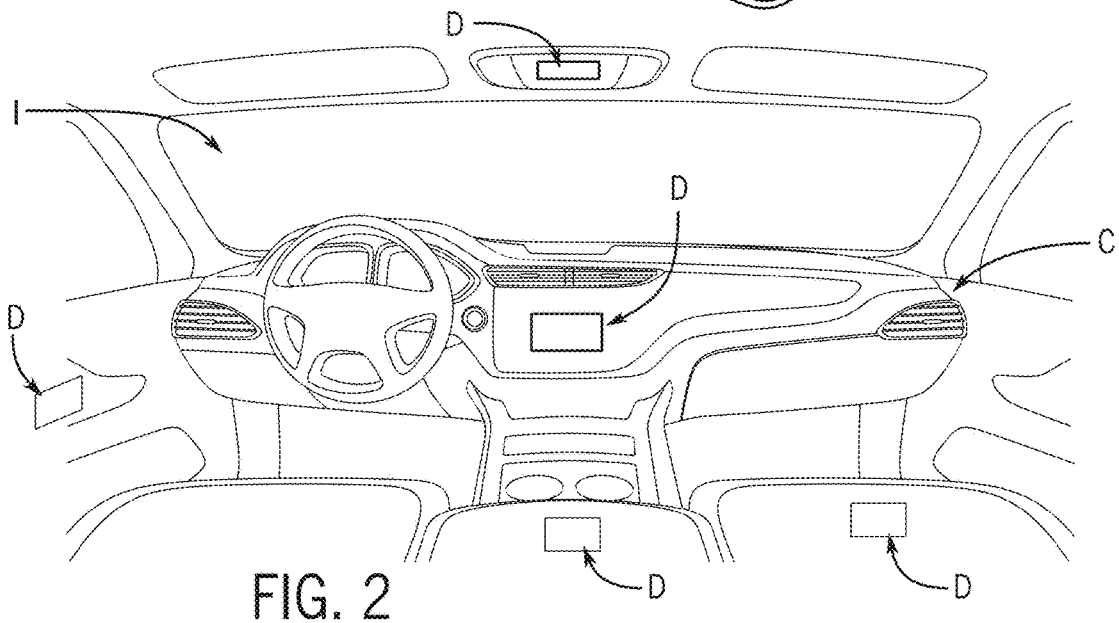
FIG. 2 is a schematic partial perspective view of a vehicle interior according to an exemplary embodiment.
Figure 3A:
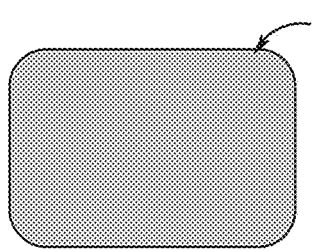
FIGS. 3A through 3C are schematic partial plan views of a vehicle interior component according to an exemplary embodiment.
Figure 3B:
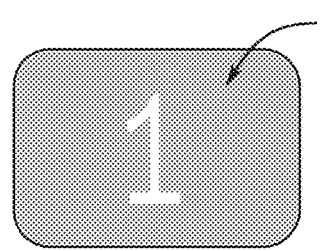
Figure 3C:
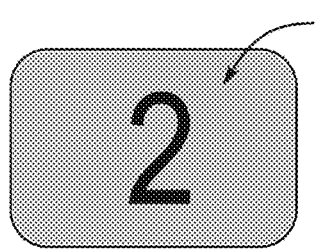
Figure 3D:
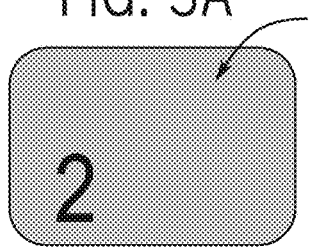
FIGS. 3D through 3F are schematic partial plan views of a vehicle interior component according to an exemplary embodiment.
Figure 3E:
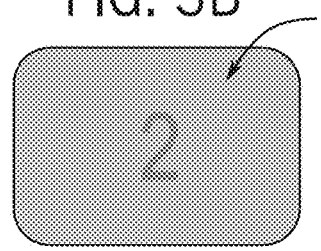
Figure 3F:
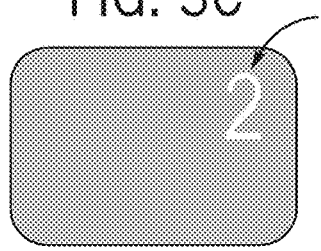

Referring to FIGS. 1A-1B and 2, a vehicle V comprising a vehicle interior I with vehicle interior component C is shown schematically according to an exemplary embodiment. As shown schematically according to an exemplary embodiment in FIGS. 2 and 3A-3F, the component C (e.g. trim components, trim panels, panels, trim, consoles, etc.) may comprise a cover with an exterior surface on which a display/display region D may be provided; as shown schematically a visual effect shown as an illuminated image IM may be presented in the display region D on the exterior surface of the cover of the component C. As indicated schematically in FIGS. 3A, 9A, 13A, 17A, 18A and 19A, the display region D may provide an "off" state with no image visible on the exterior surface of the cover; as indicated schematically in FIGS. 3B-3F and 9B-9D, the display region D may be configured to provide one or a set of "on" states in which an illuminated image IM is presented to provide one or a set of visual effects on the exterior surface of the cover (e.g. image of different colors/shapes/sizes and at different positions). See also FIGS. 13B-13D, 17B-17D, 18B-18F and 19B-19F.

Figure 4:
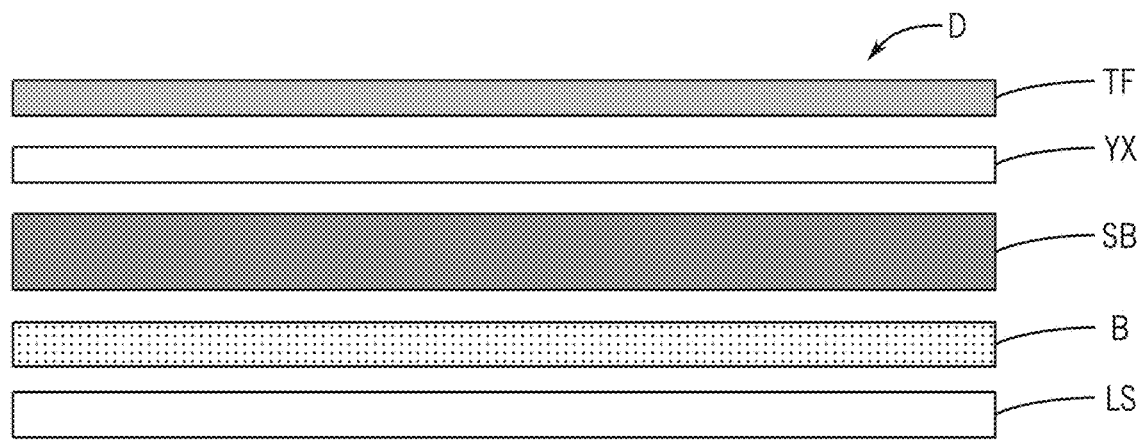
FIG. 4 is a schematic partial exploded section view of a vehicle interior component according to an exemplary embodiment.
Figure 5:
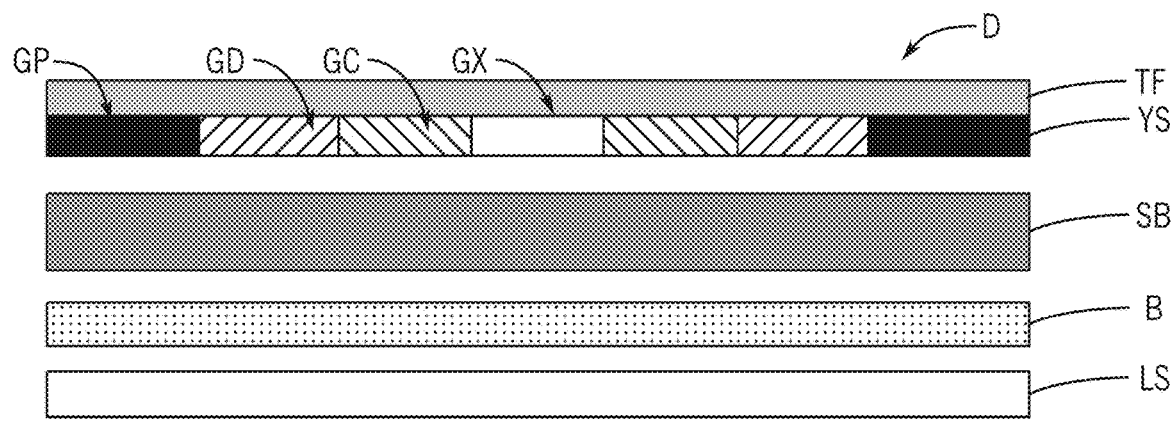
FIG. 5 is a schematic partial exploded section view of a vehicle interior component according to an exemplary embodiment.

As shown schematically according to an exemplary embodiment in FIGS. 4, 5, 6, 7 and 8, the display region D for the component C may comprise a composite structure with a base B and a light source LS (e.g. LED array, etc.) configured to present light at a selected wavelength/visible color); as shown schematically in FIG. 4, the composite structure may comprise a cover TF and a layer structure YX and a substrate/layer shown as lining SB (e.g. fabric, textile, foam, etc.). As shown schematically according to an exemplary embodiment in FIGS. 5 and 7, the layer structure YX of the composite structure may comprise a single layer shown as layer YS (applied to the cover TF or to the lining SB). See also FIGS. 4, 10A-10B, 11A-11B, 12A-12B and 13A-13D. As shown schematically according to an exemplary embodiment in FIGS. 6 and 8, the layer structure YX of the composite structure may comprise a composite layer shown as comprising layer YA and layer YB (applied to the cover TF or to the lining SB). See also FIGS. 4, 14A-14B, 15A-15B, 16A-16B and 17A-17D.

As shown schematically according to an exemplary embodiment in FIGS. 5, 7, 10B, 11B and 12B, the layer structure YX may comprise a set of segments shown as segment GX, segment GC, segment GD and segment GP; each segment may comprise a light-transmissive material (e.g. transparent, translucent, with tint/color, etc.) or an opaque material. As shown schematically in FIGS. 10B, 11B and 12B, segment GX may comprise a substantially transparent material RT, segment GC may comprise a material with tint/color RA, segment GD may comprise a material with a tint/color RB, segment GP may comprise a generally opaque material RE. As indicated schematically in FIGS. 10A-10B, 11A-11B, 12A-12B and 13A-13D, when light source LS is off (e.g. not providing light) there may be no image/visual effect presented in the display region D; when light source LS is on (e.g. providing light at a selected wavelength/color) an image may be presented as a visual effect in the display region D on the exterior surface of the cover TF. As indicated schematically in FIGS. 11A-11B, light LA provided by light source LS at a first wavelength/visible color may be transmitted through segment GX and segment GC and may be obstructed by segment GD and segment GP; an image comprising a visual effect VA may be provided in the display region D on the exterior surface of the cover TF. See also FIG. 13B. As indicated schematically in FIGS. 12A-12B, light LB provided by light source LS at a second wavelength/visible color may be transmitted through segment GX and segment GD and may be obstructed by segment GC and segment GP; an image comprising a visual effect VI may be provided in the display region D on the exterior surface of the cover TF. See also FIG. 13C.

As shown schematically according to an exemplary embodiment in FIGS. 6, 8, 14B, 15B and 16B, the layer structure YX may comprise a composite layer comprising a layer YA and a layer YB; layer YA may comprise a set of segments shown as comprising segment GA and segment GE; layer YB may comprise a set of segments shown as comprising segment GB and segment GF; each segment may comprise a light-transmissive material (e.g. transparent, translucent, with tint/color, etc.) or an opaque material. As shown schematically in FIGS. 14B, 15B and 16B, segment GB and segment GA may comprise a substantially transparent material RC, segment GE may comprise a material with tint/color RA, segment GF may comprise a material with a tint/color RB. As indicated schematically in FIGS. 14A-14B, 15A-15B, 16A-16B and 17A-17D, when light source LS is off (e.g. not providing light) there may be no image/visual effect presented in the display region D; when light source LS is on (e.g. providing light at a selected wavelength/color) an image may be presented as a visual effect in the display region D on the exterior surface of the cover TF. As indicated schematically in FIGS. 15A-15B, light LA provided by light source LS at a first wavelength/visible color may be transmitted through segment GA of layer YA and segment GB and segment GF of layer YB and may be obstructed by segment GE of layer YA; an image comprising a visual effect VY may be provided in the display region D on the exterior surface of the cover TF. See also FIG. 17B. As indicated schematically in FIGS. 16A-16B, light LB provided by light source LS at a second wavelength/visible color may be transmitted through segment GA and segment GE of layer YA and segment GB of layer YB and may be obstructed by segment GF of layer YB; an image comprising a visual effect VF may be provided in the display region D on the exterior surface of the cover TF. See also FIG. 17C.

As indicated schematically according to an exemplary embodiment in FIGS. 3A-3F, 9A-9D, 13A-13D, 17A-17D, 18A-18F and 19A-19F, variations in the visual effect/image presented in the display region D of the exterior surface of the cover TF of the component may be provided by arrangement of the position/overlap and light transmissivity/tint/opacity of light segments within the layer structure/composite layer YX of the display region D and by corresponding selection of the wavelength/color of the light transmitted by the light source LS. See also FIG. 4. As indicated schematically in FIGS. 11A-11B, 12A-12B, 15A-15B and 16A-16B, the color/tint of segments of the layer structure YX may be coordinated with the wavelength/color of light provide by the light source LS; certain segments may transmit light at a first wavelength and obstruct light at a second wavelength; certain segments may transmit light at the second wavelength and obstruct light at the first wavelength; certain segments may transmit light at a first wavelength and transmit light at a second wavelength (e.g. light-transmissive transparent/translucent); certain segments may be transparent (e.g. substantially transparent/clear, effectively colorless, translucent, etc.); certain segments may be substantially opaque (e.g. obstruct light at first wavelength and at second wavelength). As indicated schematically in FIGS. 3A-3F, 4, 5, 6, 7, 8, 9A-9D, 10B, 13A-13D, 14B, 17A-17D, 18A-18F and 19A-19F, the segments of the layer structure YX may be arranged in a pattern to present a first image/visual effect when illuminated by light at the first wavelength and a second image/visual effect when illuminated by light at the second wavelength. Compare FIGS. 9B, 13B and 17B with FIGS. 9C, 13C and 17C. Each transparent segment may comprise at least one of a light-transmissive segment configured to transmit light at the first visible color and at the second visible color, a light-transmissive segment with color configured to transmit light at the first visible color and at the second visible color, a substantially clear segment, a substantially colorless segment and/or a substantially translucent light-transmissive segment.

Exemplary Embodiments—A

Figure 6:
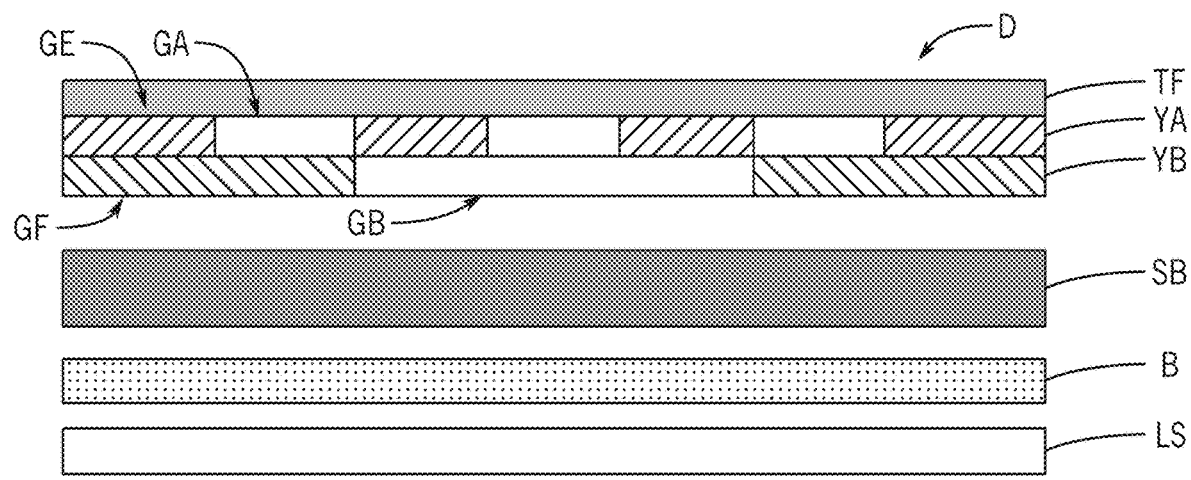
FIG. 6 is a schematic partial exploded section view of a vehicle interior component according to an exemplary embodiment.
Figure 7:
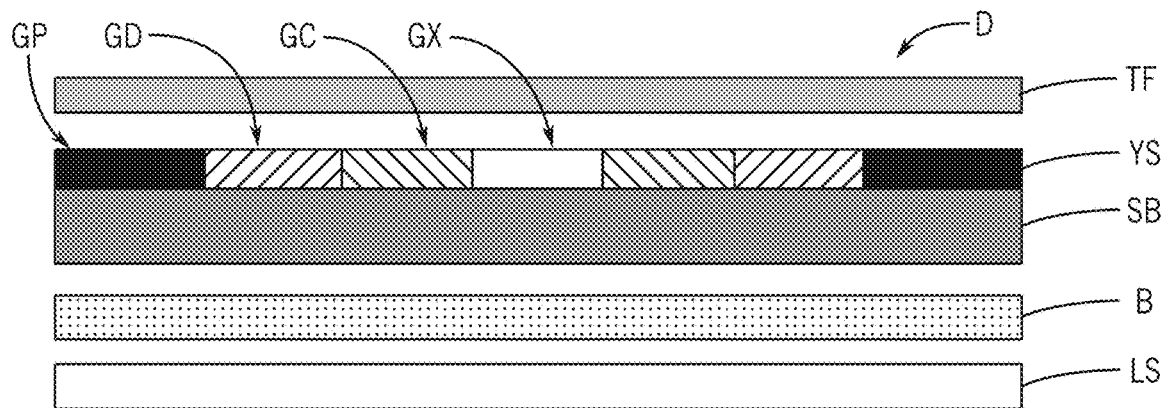
FIG. 7 is a schematic partial exploded section view of a vehicle interior component according to an exemplary embodiment.
Figure 8:
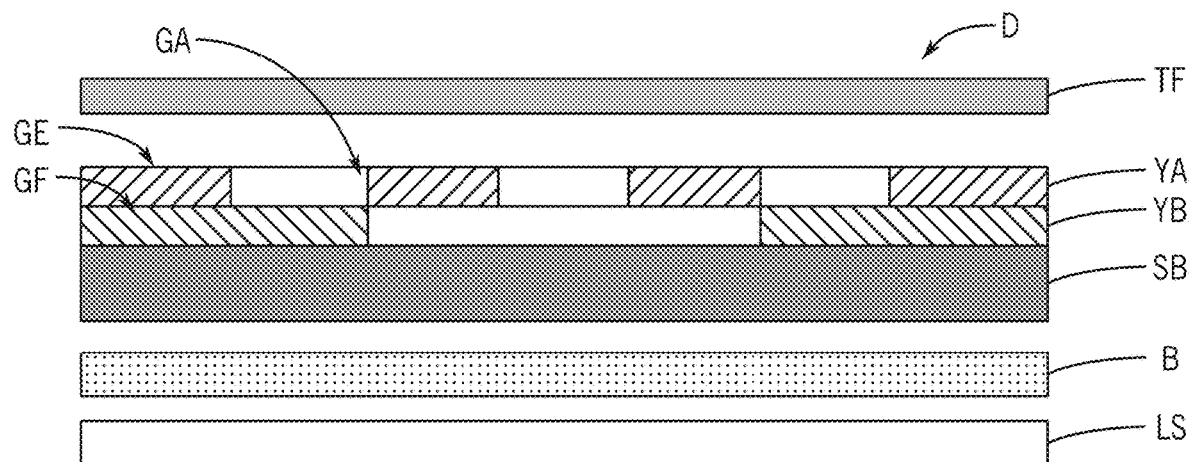
FIG. 8 is a schematic partial exploded section view of a vehicle interior component according to an exemplary embodiment.

As indicated schematically in FIGS. 4, 6 and 8, the display region D for the component C may comprise a composite structure with a cover TF comprising an exterior surface and an underside and a layer structure YX comprising a first layer YA comprising segments (e.g. first and second segments) and a second layer YB comprising segments (e.g. first and second segments); the first segment GA of the first layer YA and the first segment GF of the second layer YB may at least partially overlap in a first section of the layer structure YX; the second segment GE of the first layer YA and the second segment GB of the second layer YB may at least partially overlap in a second section of the layer structure YX; the first segment GA of the first layer YA and the second segment GB of the second layer YB may at least partially overlap in a third section of the layer structure YX. When light LA at the first wavelength is provided by the light source LS a first image may be transmitted through the second section and third section of the layer structure YX and presented on the exterior surface of the cover TF. When light LB at the second wavelength is provided by the light source LS a second image may be transmitted through the first section and third section of the layer structure YX and presented at the exterior surface of the cover TF. The first wavelength may comprise a first visible color so that the first image is presented substantially in the first visible color; the second wavelength may comprise a second visible color so that the second image is presented substantially in the second visible color. Compare FIGS. 9B, 13B and 17B with FIGS. 9C, 13C and 17C (e.g. when light at the first visible color is provided by the light source LS a first image may be presented in a second section and a third section of the display region D and when light at the second visible color is provided by the light source a second image may be presented in a first section and a third section of the display region D).

As shown schematically in FIGS. 3A-3F and 4, the exterior surface of the cover TF may comprise a display region D; the layer structure YX may be configured so that the first image may be presented in the display region D of the cover TF when the light source LS transmits light at the first wavelength and the second image may be presented in the display region D of the cover TF when the light source LS transmits light at the second wavelength. As shown schematically in FIGS. 3A-3F, 9B-9C, 13B-13C, 17B-17C, 18B-18E and 19B-19E, when light at the first wavelength/visible color is provided by the light source LS a first image may be presented in a second section and third section of display region D and when light at the second wavelength/visible color is provided by the light source LS a second image may be presented in a first section and third section of display region D.

As indicated schematically in FIGS. 4, 5, 6, 7 and 8, the layer structure YX may be applied as a coating to an underside of the cover TF; the layer structure YX may comprise a film. As indicated schematically, the layer structure YX may comprise an opaque segment; the layer structure YX may comprise a generally transparent segment configured to transmit light to the cover TF at the first wavelength and at the second wavelength; a first layer YA of the layer structure YX may be provided on the underside of the cover TF and a second layer YB of the layer structure YX may be provided on the underside of the first layer YA of the layer structure YX.

As indicated schematically in FIGS. 4, 6 and 8, the second segment GE of the first layer YA may comprise a light-transmissive segment having a first color; the first segment GA of the first layer YA may comprise a light-transmissive transparent/translucent segment configured to transmit light to the cover TF at the first wavelength and at the second wavelength; the first segment GF of the second layer YB may comprise a light-transmissive segment having the second color; the second segment GB of the second layer YB may comprise a transparent segment configured to transmit light to the cover TF at the first wavelength and at the second wavelength; light LB at the first visible color provided by the light source LS may be substantially obstructed by the first segment GF of the second layer YB of the layer structure YX; light LA at the second visible color provided by the light source LS may be substantially obstructed by the second segment GE of the first layer YA of the layer structure YX. See FIGS. 14A-14B, 15A-15B, 16A-16B and 17A-17D. The cover TF may comprise a display region D; the layer structure YX may be configured so that the first image VF is presented in the display region D of the cover TF when the light source LS transmits light LB in the first visible color and the second image VY is presented in the display region D of the cover TF when the light source LS transmits light LA at the second visible color. The layer structure YX may comprise at least one of (a) a layer structure; (b) a coating; (c) a film; (d) a two-layer coating; (e) a two-layer film.

Exemplary Embodiments—B

According to an exemplary embodiment as shown schematically, a vehicle interior component C may comprise a door panel, an instrument panel, a seat, an armrest (e.g. for door or center console, etc.) as shown schematically in FIG. 2. The component may comprise a display region D on the visible surface of the cover TF of the component C; when the display region D of the component C is illuminated by a light source LS, an image (e.g. graphic, symbol, label, numeral, etc.) may be displayed in the display region D on the visible surface of the cover TF of the component C; as indicated schematically, when color of the visible light emitted by the light source LS is changed, the image/graphic displayed on the visible surface of the component C may be changed (e.g. correspondingly) to produce an intended visual effect (e.g. with decoration and illumination effect are achieved). See FIGS. 3A-3F.

As shown schematically according to an exemplary embodiment in FIG. 4, the display D for the component C may comprise a cover shown as translucent cover TF, a base B, and a light source LS. The cover TF may comprise any one or more materials of polyurethanes, polyvinyl chlorides, polystyrenes, polyolefins, polyester elastomers, polyamides and silicone resins; the polyurethanes may be thermosetting polyurethanes or thermoplastic polyurethanes; the polyvinyl chloride may be semi-rigid polyvinyl chloride or soft polyvinyl chloride obtained by mixing polyvinyl chloride with a plasticizer and may also be polyvinyl chloride elastomer obtained by mixing polyvinyl chloride with rubber such as nitrile butadiene rubber (NBR); the polystyrene may be primarily segmented copolymer formed by polystyrene with polybutadiene, or polyisoprene, or ethylene-propylene-rubber; the polyolefin may be thermoplastic olefin (TPO) or thermoplastic vulcanizate (TPV) obtained by mixing polypropylene or polyethylene with ethylene-propylene-diene monomer (EPDM) and may also be elastomers formed by mixing polypropylene with styrene segmented copolymer; polyester elastomers are segmented copolymers comprising polyester hard segments and polyether or segmented copolymers formed by other polymer soft segments. The translucent cover TF may be formed by extrusion, casting, calendering, blow molding, and may subsequently be further stretched unidirectionally or bidirectionally to obtain a corresponding thickness; meanwhile, the translucent cover TF may also be a polymer or a monomer of a polymer mixed with water or an oily solvent to prepare a slurry, and then the slurry may be coated to obtain leather. As indicated schematically in FIG. 4, the back surface of the translucent cover TF may further be attached with a lining SB for optimizing mechanical properties and adhesive properties of the translucent cover, the lining being made of one or more of fabric, non-woven fabric, and foam.

According to an exemplary embodiment, the base B of the component C may comprise a transparent or translucent material including one or a combination of polycarbonates, polypropylenes, polymethyl methacrylates, polystyrenes, polyesters and polysulfones; mechanical reinforcing materials, such as glass fibers, carbon fibers, metal fibers, or particulate or sheet reinforcing materials of inorganic minerals or metals, may be added to the transparent or translucent material; the base B may be made of an opaque and non-light transmitting material (e.g. when the base is installed below the light source); the base B may be configured to fit with the light source in assembly (e.g. with thickness and hardness, which will fit with the interior trim component and affect the feel/haptics to a vehicle occupant). As indicated schematically in FIG. 4, the base B may comprise a transparent or translucent material and/or provide light transmittance performance; the light source LS may be arranged below the base B. The light source LS may comprise an LED lamp or light module providing multicolor visible light; the LED lamp may be an LED lamp strip or an array of multiple LED lamps (e.g. multiple LED lamps arranged corresponding to a display pattern); the light source LS may comprise a light module; the light module may be a flexible LED film or an integration of an LED lamp with any one of a light guide plate/light guide film/reflective plate/reflective film/light diffusing plate/light diffusing film/protective casing; light source LS comprising a flexible LED film may be arranged above the base B (e.g. an LED film sufficiently thin without affecting the overall thickness and haptics/feel). A portion of the base B may comprise a light-transmissive (e.g. transparent or translucent) material; visible light emitted by the light source LS may penetrate the portion/light-transmissive area to illuminate the image displayed on the visible surface of the vehicle interior component C; the portion of base B of a transparent or translucent material may cover at least all of the display region (e.g. presenting the images); the portion may be connected to other areas of the base B by any one of insert injection molding, screws, welding, gluing and clamping.

According to an exemplary embodiment, the display region D of the component C may comprise a diffuser disposed over the light source LS for increasing light scattering (e.g. light scattering layer, etc.); the diffuser may comprise a transparent or translucent sheet or film having a texture/surface roughness prepared by a surface treatment process such as sanding, embossing, drawing, sandblasting, laser carving, etching, etc., or by a process such as injection, casting, extrusion, calendering, blow molding, etc., and may also include a transparent or translucent sheet or film containing a uniformly dispersed micron-sized dispersed phase (e.g. micron-sized dispersed phase may be produced by uniformly intermixing a solid and/or liquid and/or gas incompatible with the base material in a transparent or translucent sheet or film base material). (As indicated schematically, micron-sized incompatible flame retardants and/or anti-UV adjuvants and/or pigments and/or dyes and/or fillers and the like may also be uniformly intermixed in the translucent cover and/or foaming in the translucent cover to form micron-sized holes to achieve a light diffusing effect.)

As indicated schematically in FIG. 4, the display region D for the component C may comprise a layer structure YX shown as an image layer/structure YS that provides an image form that can be displayed at the visible surface/cover of the component C. The image layer YS may comprise multiple image segments and/or peripheral segments surrounding multiple image segments. According to an exemplary embodiment, the image layer YS may comprise a coating having multiple image segments and a peripheral segment surrounding the multiple image segments formed by applying coating or ink to the surface of the translucent cover; the coating may be arranged at any one of the front or back surface of the light-transmissive/translucent cover TF, the back surface of the lining SB, the front or back surface of the light-transmissive/transparent base B, and the front or back surface of the diffuser. See FIGS. 4, 5, 6, 7 and 8. The coating providing the layer structure YS may be applied by screen printing, hot stamping, direct printing, transfer printing, spraying, etc.; each layer (with image segments) shown as comprising layer YS may be provided on the back surface of the light-transmissive/translucent cover TF; at least one layer of coating allowing visible light of a specific color to pass/penetrate may be provided on the back surface of the cover TF. According to an exemplary embodiment, the back surface of the light-transmissive/translucent cover TF may be provided with two layers of coating. See FIGS. 6 and 8. As shown schematically in FIGS. 6 and 8, a first image layer YA may be formed on the back surface of the translucent cover TF by at least partially applying a light-transmissive color RA of a first color (e.g. blue) to the back surface of the translucent cover TF; a first image segment GA may be formed where the light-transmissive color RA does not cover, the first image segment GA being filled with a colorless light-transmissive color RC; the segment covered by the color RA forms a first peripheral segment GE surrounding the first image segment GA; on the back surface of the first image layer YA, a second image layer YB may be formed by at least partially applying a light-transmissive color RB of a second color (e.g. red) to the back surface of the first image layer YA; a second image segment GB may be formed where the light-transmissive color RB does not cover, the second image segment GB being filled with a colorless light-transmissive color RC; the segment covered by the light-transmitting color RB forms a second peripheral segment GF surrounding the second image segment GB. As indicated schematically, the first image segment GA and the second image segment GB at least partially overlap. See FIGS. 6, 8, 14B, 15B and 16B. According to an exemplary embodiment shown schematically, the first image segment GA and the second image segment GB may comprise the colorless light-transmissive color RC; the color RC may be omitted or supplied for the image segments of the layer structure (e.g. to produce the intended image form). As indicated schematically, if the light-transmissive color RB enters a part of the first image segment GA when the second image layer YB is formed, the display of the image on the surface of the component may not be substantially affected.

Figure 15A:
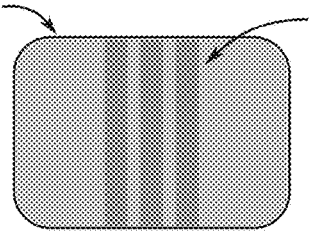
FIG. 15A is a schematic partial plan view of a vehicle interior component according to an exemplary embodiment.
Figure 15B:
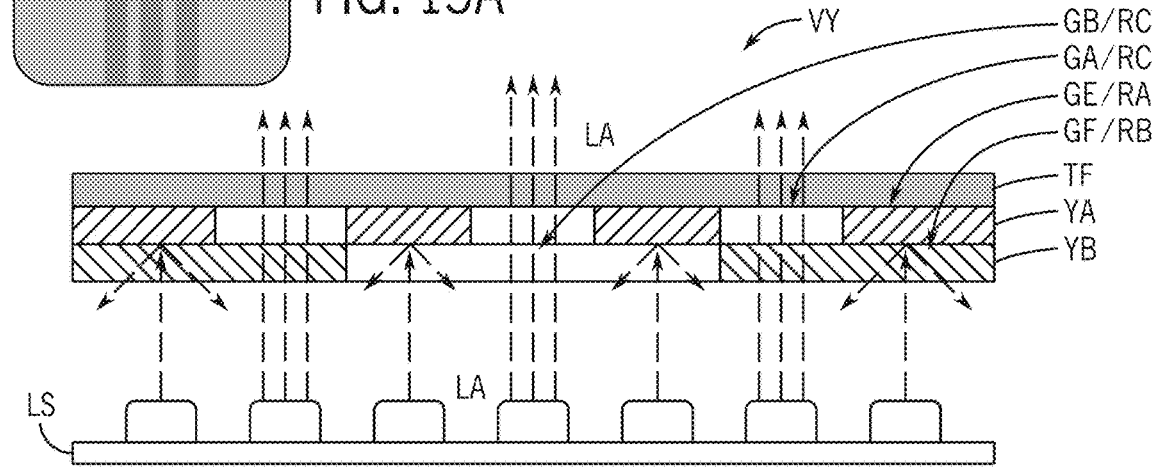
FIG. 15B is a schematic partial section view of a vehicle interior component according to an exemplary embodiment.

As shown schematically in FIGS. 15A-15B, when the light source LS emits visible light of the same color as the second color (e.g. red) of the light-transmissive color RB, the light LA can simultaneously pass through the second image segment GB and the second peripheral segment GF of the second color RB, but cannot pass through the first peripheral segment GE of the first color RA; the illuminated image visible on the surface of the vehicle interior component may be the image VY corresponding to the first image segment GA. See also FIG. 17B.

Figure 16A:
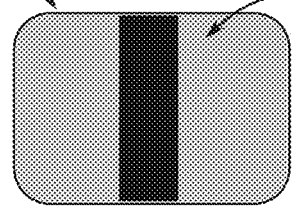
FIG. 16A is a schematic partial plan view of a vehicle interior component according to an exemplary embodiment.
Figure 16B:
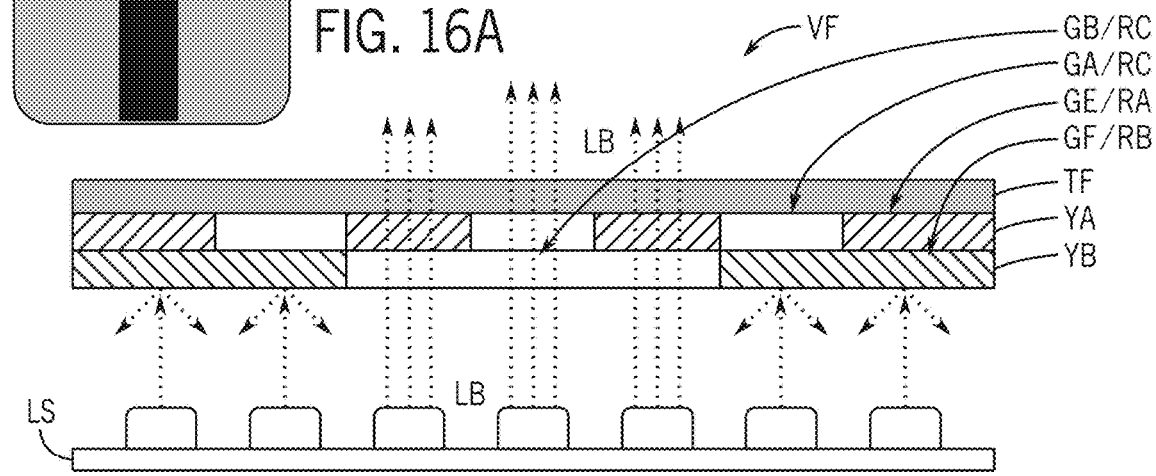
FIG. 16B is a schematic partial section view of a vehicle interior component according to an exemplary embodiment.
Figure 17A:
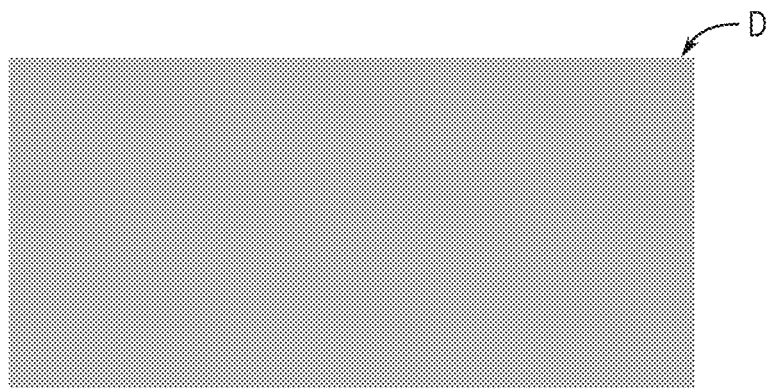
FIGS. 17A through 17D are schematic partial plan views of a vehicle interior component according to an exemplary embodiment.
Figure 17B:
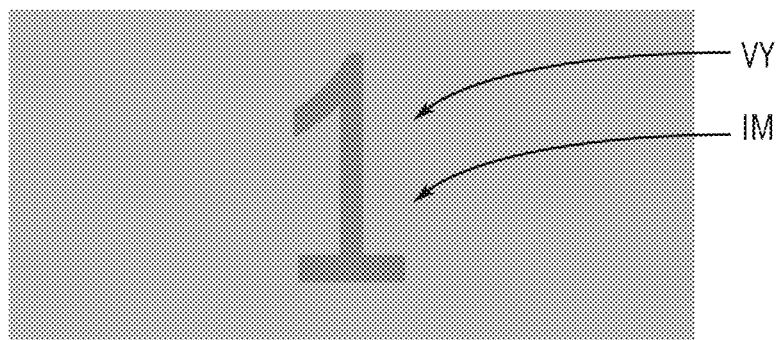
Figure 17C:
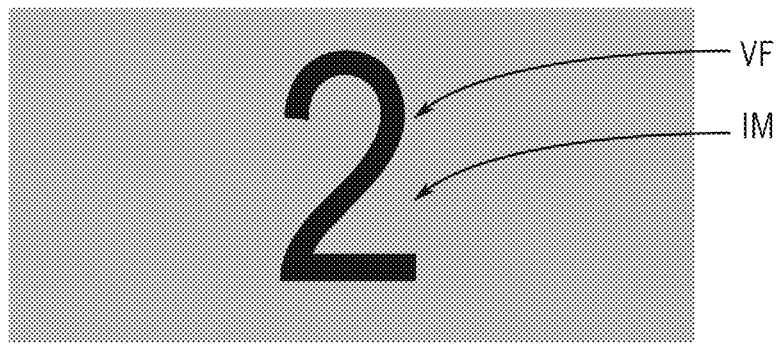
Figure 17D:
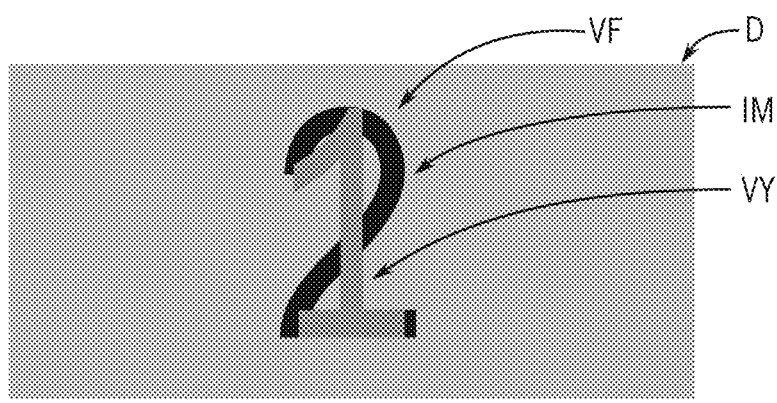

As shown schematically in FIGS. 16A-16B, when the light source LS emits visible light of the same color as the first color (e.g. blue) of the light-transmissive color RA, the light LB can simultaneously pass through the first image segment GA and the first peripheral segment GE of the first color RA, but light LB cannot pass through second peripheral segment GF of the second color RB; the first image segment GA that at least partially overlaps with the second peripheral segment GF so that the illuminated image visible on the surface of the vehicle interior component C may be the image VF corresponding substantially to the second image segment GB. See also FIG. 17C.

According to an exemplary embodiment as shown in FIGS. 5, 7 and 10B, 11B and 12B, the image layer YS may comprise a one-layer coating; as shown in FIG. 10B, the image layer YS may comprise an image segment GC and an image segment GD and a peripheral segment GP surrounding the image segment GC and the image segment GD, and the image segment GC and the image segment GD at least partially overlap to form a segment GX. By applying a light-transmissive color RA of a first color (e.g. blue) in another area on the back surface of the translucent cover TF corresponding to an area in the image segment GC except for the segment GX, applying a light-transmissive color RB of a second color (e.g. red) in another area corresponding to an area in the image segment GD except for the segment GX, and applying a colorless light-transmissive color RC in the segment GX, the image segment GC and the image segment GD are provided for the layer structure. See FIGS. 10B, 11B and 12B. As shown schematically in FIGS. 10B, 11B and 12B, the peripheral segment GP surrounding the image segment GC and the image segment GD may be formed by applying an opaque color RE or a light-transmissive coating (e.g. pigment, paint, tint, colorant, etc.) of a color other than the first color and the second color.

As shown in FIG. 11B, when the light source LS emits visible light LA of the same color as the first color (e.g. blue) of the light-transmissive color RA, the light LA can pass through the image segment GC including the segment GX, but light LA cannot pass through image segment GD of the second color RB; the illuminated image visible on the surface of the vehicle interior component C may be image VA corresponding to the image segment GC and the segment GX. See also FIG. 13B.

As shown in FIG. 12B, when the light source LS emits visible light LB of the same color as the second color (e.g. red) of the light-transmissive color RB, the light LB can pass through the image segment GD including the segment GX, but light LB cannot pass through image segment GC of the first color RA; the illuminated image visible on the surface of the vehicle interior component C may be the image VI corresponding to the image segment GD and the segment GX.

Figure 9A:
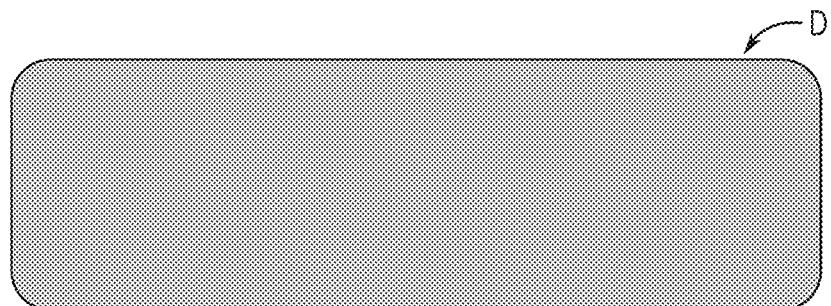
FIGS. 9A through 9D are schematic partial plan views of a vehicle interior component according to an exemplary embodiment.
Figure 9B:
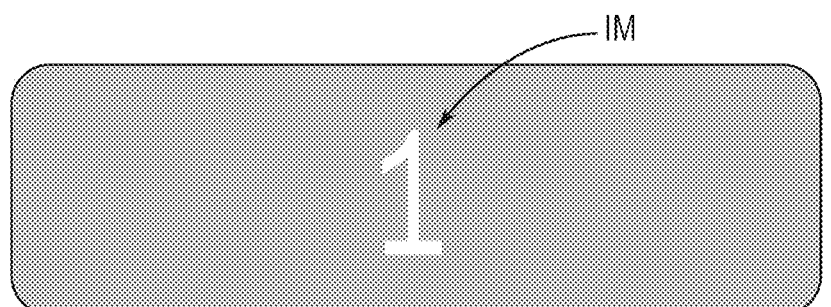
Figure 9C:
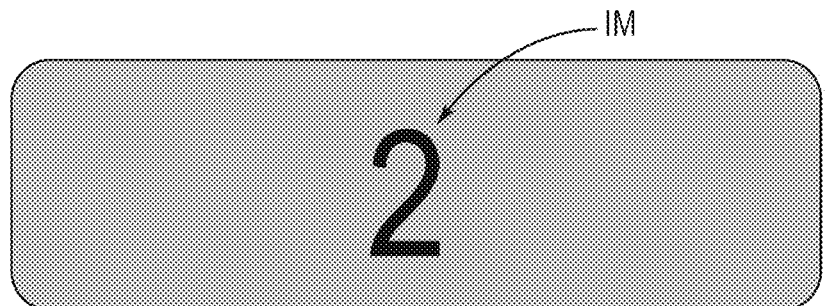
Figure 18A:
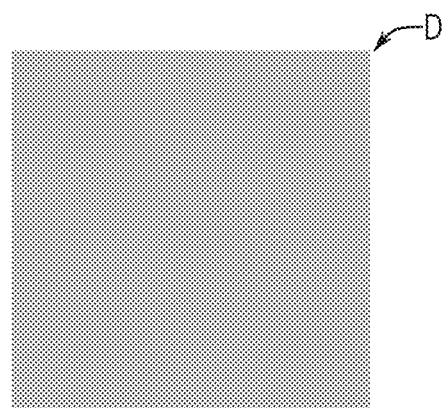
FIGS. 18A through 18F are schematic partial plan views of a vehicle interior component according to an exemplary embodiment.
Figure 18B:
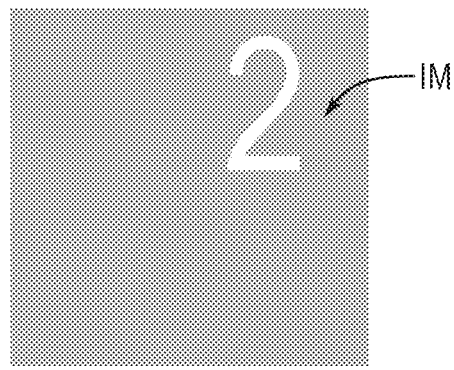
Figure 18C:
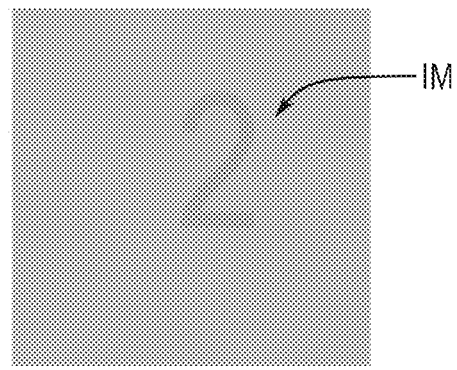
Figure 18D:
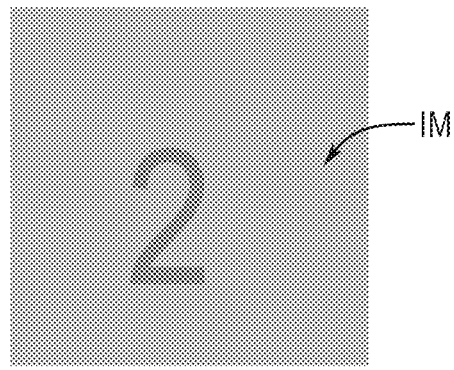
Figure 18E:
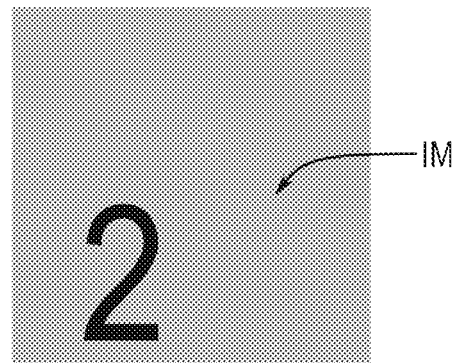
Figure 18F:
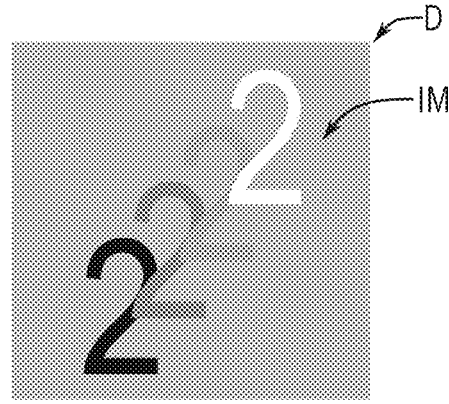
Figure 19B:
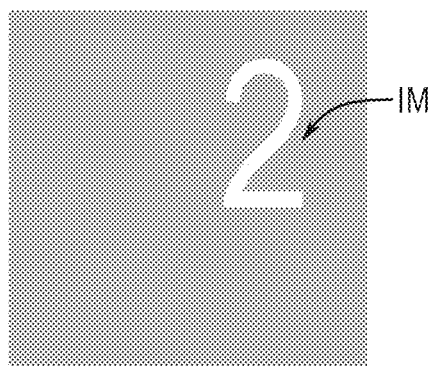
Figure 19C:
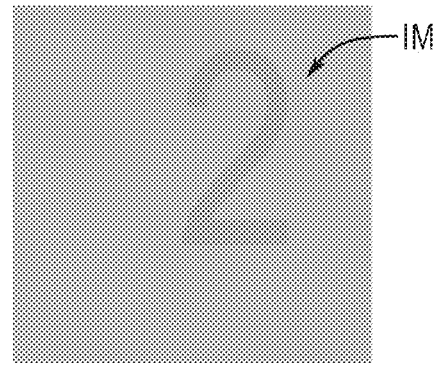

As shown schematically in FIGS. 9A, 9D, 18F and 19F, different images may be presented in the display region D on the surface of the cover TF of the component C when illuminated by visible light of different colors/wavelength. See also FIGS. 3A-3F. As indicated schematically in FIGS. 3A-3F and 9A-9D, when the light source LS does not emit light, no image may be displayed in the display region D on the surface of the component C (as shown in FIG. 9A); when the light source LS emits visible light LA of the first color, an image corresponding to one of multiple image segments (numeral "1" shown in FIG. 9B) shows in the display region D on the surface of the vehicle interior component C and the image appears in the first color; when the light source LS emits visible light LB of the second color, an image corresponding to another image segment of the multiple image segments (numeral "2" shown in FIG. 9C) shows in the display region D on the surface of the component C and the image appears in the second color. As indicated schematically, multiple image segments may at least partially overlap (e.g. numerals "1" and "2" are shown as simultaneously displayed in FIG. 9D); according to an exemplary embodiment, when the numeral "1" is displayed, the numeral "2" is not displayed (and when the numeral "2" is displayed, the numeral "1" is not displayed, see FIGS. 9B and 9C). As indicated schematically in FIGS. 3A-3F, 18A-18D and 19A-19F, by changing the color of the visible light emitted by the light source LS, the color and/or shape and/or position and/or size of the image displayed on the surface of the vehicle interior component C can be changed; by changing the visible light emitted from the light source LS, the color and position of the image displayed on the surface of the vehicle interior component C may be changed (e.g. numeral "2" with a position gradually shifted as shown in FIG. 18F) or the color, position and dimension of the image displayed on the surface of the vehicle interior component C may be changed (e.g. numeral "2" gradually reduced in size/dimension as indicated schematically in FIG. 19F). According to an exemplary embodiment, images to be presented in the display region may comprise any of wide variety of images, characters, symbols, forms, shapes, sizes, logos, or any form of display element (e.g. elements as selected/designed for the component C).

According to an exemplary embodiment as shown schematically in FIG. 4, at the layer structure YX of the component C by changing the number of the coatings, the color of the coatings, and the image segment on each coating, a visual effect may be achieved at the display comprising display elements of a different image/form as the color of the visible light emitted by the light source changes; the layer structure YX comprising image layer YS or composite layer YA and YB may be formed by one of a transparent or translucent film, adhesive film, and adhesive tape, a coating, paint, etc. According to an exemplary embodiment, to provide personalized/selected decoration for wants/needs of customers, a decorative coating capable of transmitting visible light of various colors may be provided in the display region on the surface of the cover of the component C; the decorative coating may comprise a single layer (e.g. such as decorative colors of beige, real wood color, marble color, etc.); the light transmissive performance of decorative coating may be adjusted by adjusting the thickness of the decorative coating or the concentration of color additives such as pigments, dyes and the like in the coating. As indicated schematically, when the image layer YS is arranged on the front surface of the light-transmissive/translucent cover TF, the decorative coating may be applied on the front surface of the image layer YS; when the image layer YS is arranged on the back surface of the cover TF or the lining SB, the decorative coating may be applied on the front surface of the cover TF.

According to an exemplary embodiment, a soft-touch feeling may be provided for the component with a buffer layer such as one or more of foam, 3D mesh, fabric, high-compressible rubber/elastomer/gel and porous foam materials. See FIGS. 1B and 2. According to an exemplary embodiment indicated schematically in FIGS. 1B and 2, the vehicle interior component may comprise a sensor disposed at a position such as the reverse surface of the translucent cover, the reverse surface of the lining, the front surface or the back surface of the base, a position integrated with the light source; the sensor may comprise a pressure-sensitive sensor, a capacitive sensor, a sound sensor or a temperature sensor, etc.; the component may be configured to vary in response to the sensed feedback of various environmental signals (e.g. pressure, voltage, sound, temperature, etc.). According to an exemplary embodiment as indicated schematically in FIGS. 4, 5, 6, 7 and 8, the elements of the component such as any two of the translucent cover, the image layer, the base, the lining, the buffer layer, the diffuser and the light source may be connected through any one of bonding, welding, clamping and screw connection.

As shown schematically in FIGS. 3A-3F, 9A-9D, 18A-18F and 19A-19F, a superposition effect may be provided for the component C with an image IM on the surface when the display region D of the component C is illuminated by visible light with a selected wavelength/colors emitted by a light source LS (e.g. the shape of the image has changed); a superposition effect may be provided for an image IM showing on the surface when the display region D of the component C is illuminated by visible light with a selected wavelength/color emitted by a light source LS (e.g. the position of the image has changed); a superposition effect may be provided for an image IM showing on the surface when the display region D of the component C is illuminated by visible light with a selected wavelength/color emitted by a light source LS (e.g. the size of the image has changed). (As indicated schematically in FIG. 9D, the first image segment "1" and the second image segment "2" are overlapped in the display region D; if the light source LS emits light LA and light LB at the same time an overlapping area of the images IM may appear in a third color formed by overlapping the first color and the second color (e.g. in combination).)

According to an exemplary embodiment as shown schematically in FIGS. 2, 3A-3D, 4, 5, 6, 7, 8 and 9A-9D, the component C with display/display region D may be configured to provide for improved structure and decorative/visual effect within a vehicle interior (e.g. in ambient light, etc.); the component C may comprise a light-transmissive cover and an image layer comprising multiple image segments; an image presented may comprise/correspond to at least one of the multiple image segments as appearing on a visible surface of the component when the component is illuminated by visible light emitted from the rear side; the image on the visible surface of the vehicle interior component may change in response to the color of the visible light changes. As indicated schematically in FIGS. 10B, 11B and 12B, multiple image segments of the image layer YS may at least partially overlap to form an overlapping segment. See also FIGS. 14B, 15B and 16B. According to an exemplary embodiment, when the image layer is composed of one layer, the overlapping segment of the multiple image segments may be arranged to be colorless (e.g. transparent) or translucent; other areas of the multiple image segments transmit only light corresponding to the color of the specific image segment; peripheral segments surrounding the multiple image segments may be opaque (e.g. do not transmit light). According to an exemplary embodiment, when the image layer is composed of multiple layers, multiple image segments may be located on different image layers, the multiple image segments are arranged to be colorless and transparent or translucent, and other areas of each image layer surrounding the multiple image segments transmit only light corresponding to the color of the peripheral segment.

According to an exemplary embodiment, a change of the image may comprise a change in a combination of any one or more of color, shape, size/dimension and position of the image. The visible light may be provided by one LED lamp or lamplight module that provides polychromatic visible light. The light-transmissive cover may comprise any one or more materials of polyurethanes, polyvinyl chlorides, polystyrenes, polyolefins, polyester elastomers, polyamides, and silicone resins. According to an exemplary embodiment, the component may comprise at least a portion or partial area of the base (or lining) being made of a transparent or translucent material; the partial area may cover multiple image segments of the image layer/layer structure; the partial area of the base may be connected to other areas of the base by any one of insert injection molding, screws, welding, gluing and clamping; the light source may be beneath the base if the base is light transmissive (e.g. transparent, translucent, etc.) or if at least a partial area of the base is light transmissive (e.g. transparent, translucent, etc.); a light-transmissive material (e.g. transparent or translucent material) may comprise a combination of one or more of polycarbonate, polypropylene, polymethyl methacrylate, polystyrene, polyester and polysulfone. The image layer may comprise a combination of any one or more of transparent or translucent film, coating, ink, adhesive tape and adhesive film; the image layer is formed by any one process of screen printing, hot stamping, spraying, and gluing. The cover may comprise a base on the back surface of the light transmissive cover/layer. The base may comprise one or more of fabric, non-woven fabric and foam; the component may comprise a buffer layer over the base, the buffer layer may comprise one or more of foam, three-dimensional mesh, fabric, high-compressible rubber/elastomer/gel and porous foam materials. The component may comprise a diffuser over the light source; the diffuser may comprise a transparent or translucent sheet or film having a certain surface roughness prepared by a surface treatment process such as sanding, embossing, drawing, sandblasting, laser carving, etching, etc., or by a process such as injection, casting, extrusion, calendering, blow molding, etc., and may also include a transparent or translucent sheet or film containing a uniformly dispersed micron-sized dispersed phase. The micron-sized dispersed phase is produced by uniformly intermixing a solid and/or liquid and/or gas incompatible with the base material in a transparent or translucent sheet or film base material.

The diffuser may be disposed between the light source and the cover; if the component comprises a buffer layer, the diffuser may be disposed on the buffer layer.

According to an exemplary embodiment, the light-transmissive/translucent cover may comprise a uniformly dispersed material such as a micron-sized incompatible flame-retardant and/or anti-ultraviolet (UV) shield and/or pigments and/or dyes and/or fillers and/or holes formed by foaming to achieve diffusing effect. According to an exemplary embodiment, the image layer/composite layer may comprise a layer structure at any of the front surface or the reverse surface of the translucent cover, the front surface or the reverse surface of the base, the front surface or the reverse surface of the base, the front surface or the reverse surface of the diffuser, etc. According to an exemplary embodiment, the component may comprise a sensor on any one of a back surface of the translucent cover, aback surface of the base, a front surface or a back surface of the base, integrated with a light source, etc.

According to an exemplary embodiment, the display region of the component may be configured to provide image corresponding to at least one of a plurality of image segments visible on a surface of the cover when visible light is emitted from a light source, and the visible image may change in response to a change in color of the visible light emitted from the light source.

According to an exemplary embodiment as indicated schematically in FIGS. 1B, 2 and 3A-3F, the component may comprise automotive interior trim to be installed in the vehicle interior with intent to improve the quality, decorative effect and driving experience for vehicle occupants.

As shown schematically in FIGS. 2, 3A-3F, 4, 5, 6, 7 and 8, the vehicle interior trim/component may comprise a translucent surface layer shown as cover TF and a pattern layer shown as layer structure YX comprising layer YS or composite layer YA and layer YB; the pattern layer may comprise multiple image/graphic areas characterized in that a graphic shown as image IM that corresponds to at least one graphic area among the multiple graphic areas may only be shown on a viewable surface of the vehicle interior trim when the vehicle interior trim is illuminated by visible backlight emitted by a light source; and the graphic shown on the viewable surface of the vehicle interior trim changes in response to changes to a color of the visible light. See also FIGS. 9A-9D, 18A-18F and 19A-19F. As indicated schematically in FIGS. 6, 8, 14A-14B, 15A-15B and 16A-16B, multiple graphic areas of the pattern layer at least partially overlap to form an overlapping area; the pattern layer may be one layer; the overlapping area of the multiple graphic areas may be colorless and transparent or translucent; other areas of the multiple graphic areas may be configured to allow light corresponding to a color of the graphic area to pass through; peripheral areas surrounding the multiple graphic areas may be configured not to allow the light to pass through; the pattern layer may be of multiple layers; multiple graphic areas may be at different pattern layers, multiple graphic areas may be disposed to be colorless and transparent or translucent; peripheral areas of each of the pattern layers surrounding the multiple graphic areas only allow light corresponding to a color of the peripheral area to pass through. As indicated schematically, a change of the graphic shown as image IM may comprise a change in a combination of any one or more of color, shape, dimension and position of the graphic; visible light may be disposed to be provided by one LED lamp or lamplight module that provides polychromatic visible light; a translucent surface layer may comprise any one or more materials of polyurethanes, polyvinyl chlorides, polystyrenes, polyolefins, polyester elastomers, polyamides, and silicone resins. The light-transmissive material (e.g. transparent or translucent material) for the cover or base or lining of the component may comprise a combination of one or more of polycarbonate, polypropylene, polymethyl methacrylate, polystyrene, polyester and polysulfone. The pattern layer shown as layer structure YX/YS may comprise a combination of any one or more of transparent or translucent film, painting, ink, adhesive tape and adhesive film; the pattern layer may be formed by any one process of screen printing, hot stamping, spraying, and gluing.

As indicated schematically in FIGS. 1B, 2, 3A-3D, 4, 5, 6, 7 and 8, the component C with display region D may comprise a cover TF and an image layer shown as layer structure YX comprising multiple segments shown as image segments; the display region D may be configured so that an image that corresponds to at least one image segment among the multiple image segments may be shown on the visible surface of the cover TF of the component C when illuminated by visible light emitted by a light source LS; the image IM shown in the display region D on the visible surface of the cover TF of the component C may be changed by changing the color of the visible light emitted by the light source LS. According to an exemplary embodiment as indicated in FIGS. 1B, 2 and 3A-3F, the display D for the component C is intended to provide the image IM on the surface of the cover to enhance the appearance of the vehicle interior. As indicated schematically in FIGS. 1B, 2, 3A-3F, 4, 5, 6, 7 and 8, the component C providing display region D may comprise a composite structure comprising a cover TF and a composite layer YS and a light source LS configured to provide light LB at a first visible color and light LA at a second visible color; the composite structure may comprise a first layer YA comprising a first segment and a second segment and a second layer YB comprising a first segment and a second segment; the first segment of the first layer YA and the first segment of the second layer YB may at least partially overlap in a first section; the second segment of the first layer YA and the second segment of the second layer YB at least partially overlap in a second section; the first segment of the first layer YA and the second segment of the second layer YB may at least partially overlap in a third section; when light at the first visible color is provided by the light source LS a first image is presented in the second section and the third section and transmitted to present the first image on the cover; when light at the second visible color is provided by the light source a second image is presented in the first section and the third section and transmitted to present the second image on the cover. The first segment and the second segment of the first layer YA are light-transmissive; the second segment of the first layer YA may comprise a light-transmissive segment having a first color; the first segment of the first layer YA may comprise a transparent segment; the first segment of the second layer YB may comprise a light-transmissive segment having a second color; the second segment of the second layer YB may comprise a transparent segment. As indicated schematically in FIGS. 1B, 2, 3A-3F, 4, 5, 6, 7 and 8, the cover may comprise a display region; the composite structure may be configured so that the first image is presented in the display region of the cover when the light source transmits light in the first visible color and the second image is presented in the display region of the cover when the light source transmits light at the second visible color. According to an exemplary embodiment, the composite layer of the layer YX may comprise at least one of a layer structure, a coating, a film, a two-layer coating, a two-layer film, etc. See FIGS. 6, 8 and 14B.

As shown schematically according to an exemplary embodiment in FIGS. 2, 3A-3F, 4, 5, 6, 7, 8, 9A-9D, 18A-18F and 19A-19F, a vehicle interior component comprising a cover with a surface providing a display region may comprise a composite layer/structure and light source to provide light at a first visible color/wavelength and a second visible color/wavelength to the display region; the composite layer may comprise light-transmissive segments with color and light-transmissive transparent/translucent segments; light at first wavelength is transmitted through a first segment and transparent/translucent segment to present a first image/visual effect at the display region; light at second wavelength is transmitted through a second segment and transparent/translucent segment to present a second image/visual effect at the display region; light at first wavelength is obstructed by the second segment; light at second wavelength is obstructed by the first segment; transparent/translucent segments transmit light at first wavelength and second wavelength. As shown schematically, the composite layer with segments may comprise a single-layer form or a multi-layer form applied to or on the underside of the cover. See FIGS. 4, 10B, 11B, 12B and 14B, 15B, 16B.

Exemplary Embodiments—C

According to an exemplary embodiment, a vehicle interior component C may be provided in a vehicle interior such as a door panel, an instrument panel, a seat, or an armrest between a driver and a passenger as shown schematically in FIG. 2. When the vehicle interior component is illuminated by a light source, an image may be displayed on a visible surface of the vehicle interior component. When the color of the visible light emitted by the light source is changed, the image displayed on the visible surface of the vehicle interior component may change to provide a decorative and/or an illumination effect. The vehicle interior component C is not limited to vehicle interiors use but is also applicable to other fields.

As shown schematically in FIG. 4, the vehicle interior component may comprise a translucent cover TF, a base B, and a light source LS.

Translucent cover TF may comprise any one or more materials of polyurethanes, polyvinyl chlorides, polystyrenes, polyolefins, polyester elastomers, polyamides and silicone resins. The polyurethanes may comprise thermosetting polyurethanes or thermoplastic polyurethanes. The polyvinyl chloride may comprise a semi-rigid polyvinyl chloride or soft polyvinyl chloride obtained by mixing polyvinyl chloride with a plasticizer. The polyvinyl chloride may comprise a polyvinyl chloride elastomer obtained by mixing polyvinyl chloride with rubber such as Nitrile Butadiene Rubber (NBR). The polystyrene may comprise a segmented copolymer formed by polystyrene with polybutadiene, or polyisoprene, or ethylene-propylene-rubber. The polyolefin may comprise thermoplastic olefin (TPO) or thermoplastic vulcanizate (TPV) obtained by mixing polypropylene or polyethylene with ethylene-propylene-diene monomer (EPDM). The polyolefin may comprise an elastomer formed by mixing polypropylene with styrene segmented copolymer. Polyester elastomers are segmented copolymers comprising polyester hard segments and polyether or segmented copolymers formed by other polymer soft segments. Translucent cover TF may be formed by extrusion, casting, calendering or blow molding, and may be stretched unidirectionally or bidirectionally to obtain a corresponding thickness; translucent cover TF may comprise a polymer or a monomer of a polymer mixed with water or an oily solvent to prepare a slurry; the slurry may be coated to obtain leather.

The back surface of translucent cover TF may be attached with a lining SB for optimizing mechanical properties and adhesive properties of the translucent cover. The lining may comprise one or more of fabric, non-woven fabric, and foam.

Base B may comprise a transparent or translucent material comprising one or a combination of polycarbonates, polypropylenes, polymethyl methacrylates, polystyrenes, polyesters and polysulfones. Certain mechanical reinforcing materials, such as glass fibers, carbon fibers, metal fibers, or particulate or sheet reinforcing materials of inorganic minerals or metals may be added to the transparent or translucent material.

The base may comprise an opaque and non-light transmitting material; the light source may be arranged above the base; the light source may comprise a thickness and hardness, which may occupy space in the vehicle interior trim and affect the feel.

When base B comprises a transparent or translucent material and has light transmittance performance, light source LS may be arranged below base B. Light source LS may comprise an LED lamp or light module providing multicolor visible light. The LED lamp may be an LED lamp strip, an array of multiple LED lamps, or multiple LED lamps arranged corresponding to a display pattern of a vehicle interior component. The light module may comprise a flexible LED film or an integration of an LED lamp with any one of a light guide plate/light guide film/reflective plate/reflective film/light diffusing plate/light diffusing film/protective casing. The light source may comprise a flexible LED film arranged above the base; the flexible LED film may be thin, minimally affecting the overall thickness and feel of the vehicle interior component.

An area of base B may comprise a transparent or translucent material; visible light emitted by light source LS may pass through the area of the base to illuminate an image displayed on a visible surface of the vehicle interior component. The area of the base may be coupled to another area of the base by one of insert injection molding, screws, welding, gluing and clamping.

The vehicle interior component may comprise a diffuser or a light scattering layer over the light source configured to increase light scattering. The diffuser may comprise a transparent or translucent sheet or film having a surface roughness; the diffuser may be prepared by a surface treatment process such as sanding, embossing, drawing, sandblasting, laser carving, etching, etc.; the diffuser may be prepared by a process such as injection, casting, extrusion, calendering, blow molding, etc.; the diffuser may comprise a transparent or translucent sheet or film containing a uniformly dispersed micron-sized dispersed phase. The micron-sized dispersed phase may be produced by uniformly intermixing a solid and/or liquid and/or gas incompatible with the base material in a transparent or translucent sheet or film base material. Micron-sized incompatible flame retardants and/or anti-UV adjuvants and/or pigments and/or dyes and/or fillers may be uniformly intermixed in the translucent cover and/or foaming in the translucent cover may form micron-sized holes to achieve a light diffusing effect.

The vehicle interior component may comprise an image layer YS comprising an image to be displayed on a visible surface of the vehicle interior component. The image layer may comprise multiple image segments and a peripheral segment surrounding the image segments. According to an exemplary embodiment, the image layer may comprise a coating comprising multiple image segments and a peripheral segment surrounding the image segments; the peripheral segment may be formed by applying coating or ink to a surface of the translucent cover. The coating may be arranged at any one of a front or back surface of translucent cover TF, a back surface of lining SB, a front or back surface of transparent base B, and a front or back surface of the diffuser. The coating may be applied by a process comprising at least one of screen printing, hot stamping, direct printing, transfer printing, or spraying.

According to an exemplary embodiment, image layer YS may be arranged on a back surface of translucent cover TF. A back surface of translucent cover TF may comprise at least one layer of coating allowing visible light of a specific color to pass through.

According to an exemplary embodiment, a back surface of translucent cover TF may comprise two layers of coating. As shown schematically in FIGS. 15B and 16B, a first image layer YA may be formed on a back surface of translucent cover TF by at least partially applying a light-transmissive color RA of a first color (e.g. blue) to the back surface of translucent cover TF. A first image segment GA may be formed where the light-transmissive color RA does not cover; first image segment GA may be filled with a colorless light-transmissive color RC. An area covered by color RA may form a first peripheral segment GE surrounding image segment GA. On a back surface of first image layer YA, a second image layer YB may be formed by at least partially applying a light-transmissive color RB of a second color (e.g. red) to the back surface of first image layer YA. A second image segment GB may be formed where light-transmissive color RB does not cover; second image segment GB may be filled with a colorless light-transmissive color RC. The segment covered by light-transmitting color RB may form a second peripheral segment GF surrounding second image segment GB. First image segment GA and second image segment GB may at least partially overlap. First image segment GA and second image segment GB may be filled with colorless light-transmissive color RC. Color RC may be omitted. When light-transmissive color RB enters a part of first image segment GA when second image layer YB is formed, the display of the image on the surface of the vehicle interior component may not be affected.

According to an exemplary embodiment as shown schematically in FIG. 15B, when light source LS emits visible light of the same color as the second color (e.g. red) of light-transmissive color RB, light LA may pass through second image segment GB and second peripheral segment GF of second color RB, but may not pass through first peripheral segment GE of first color RA. An illuminated image visible on the surface of the vehicle interior component is shown schematically as image VY corresponding to first image segment GA.

According to an exemplary embodiment as shown schematically in FIG. 16B, when light source LS emits visible light of the same color as the first color (e.g. blue) of light-transmissive color RA, light LB may pass through second image segment GB, and first peripheral segment GE of first color RA, but may not pass through second peripheral segment GF of second color RB. First image segment GA may overlap with the second peripheral segment GF so that an illuminated image visible on the surface of the vehicle interior component, shown schematically as image VF, corresponds to second image segment GB.

Figure 9D:
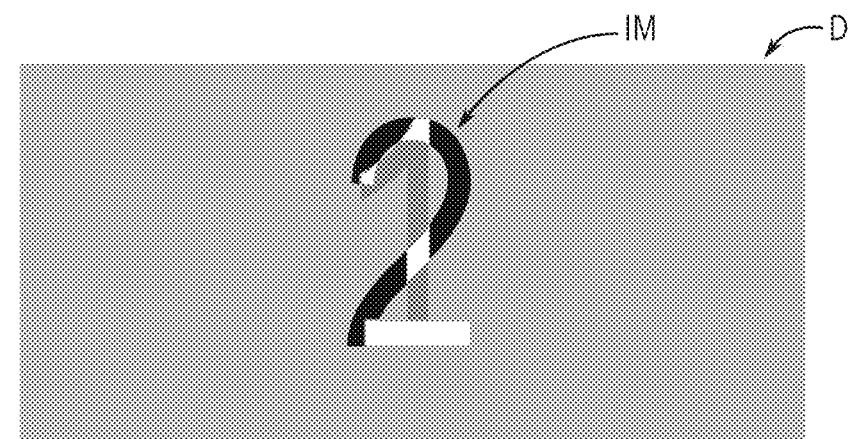
Figure 13A:
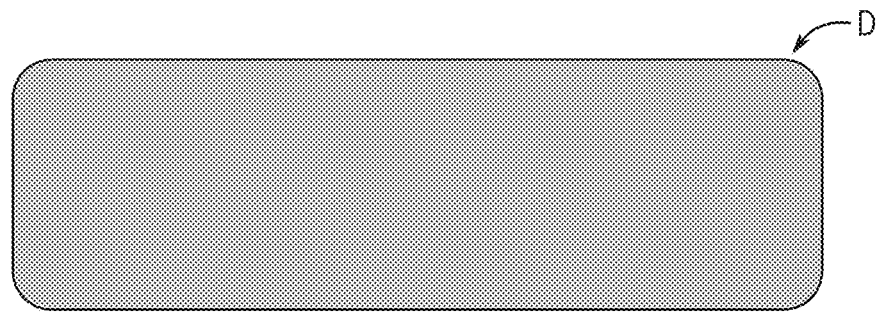
FIGS. 13A through 13D are schematic partial plan views of a vehicle interior component according to an exemplary embodiment.
Figure 13B:
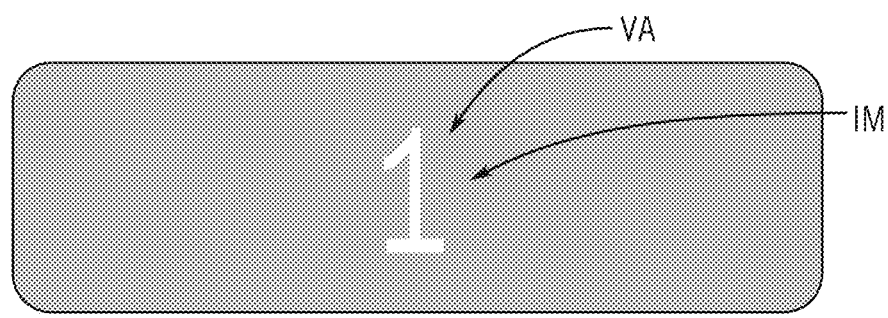
Figure 13C:
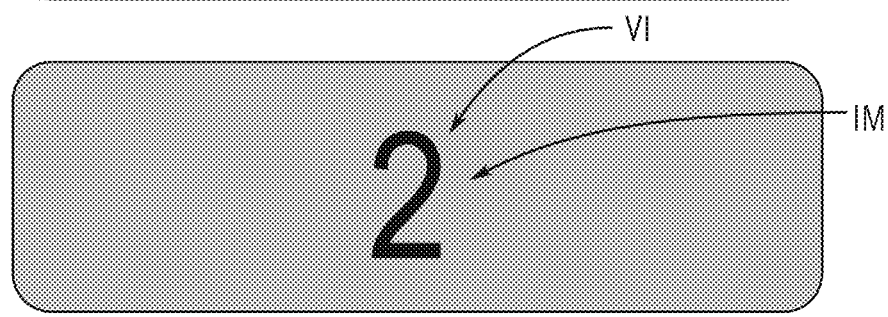
Figure 13D:
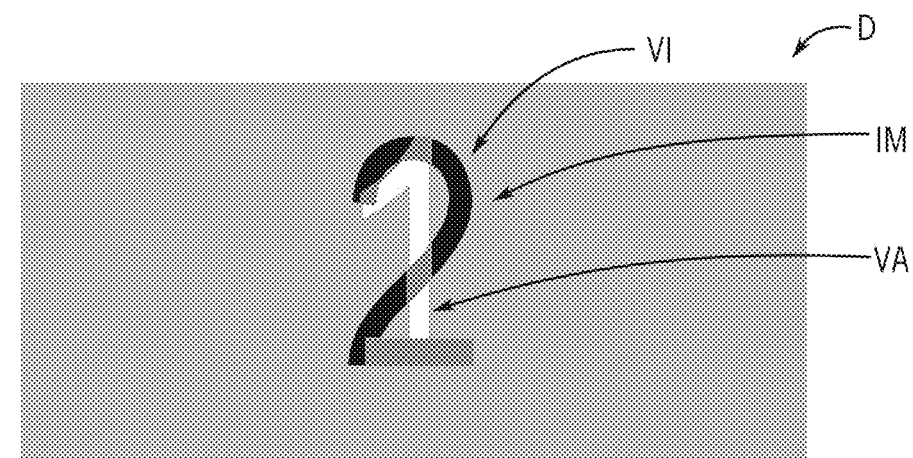
Figure 14A:
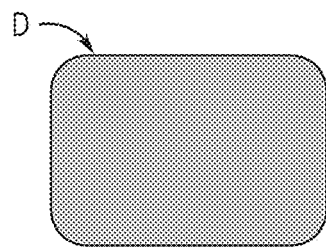
FIG. 14A is a schematic partial plan view of a vehicle interior component according to an exemplary embodiment.
Figure 14B:
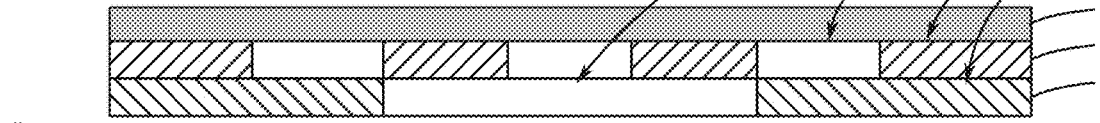
FIG. 14B is a schematic partial section view of a vehicle interior component according to an exemplary embodiment.

According to an exemplary embodiment, image layer YS may comprise a one-layer coating as shown schematically in FIGS. 9D, 11B and 12B. Image layer YS may comprise a third image segment GC and a fourth image segment GD and a peripheral segment GP surrounding third image segment GC and fourth image segment GD; third image segment GC and fourth image segment GD may at least partially overlap to form a segment GX. By applying a light-transmissive color RA of a first color (e.g. blue) in another area on a back surface of translucent cover TF corresponding to an area in the third image segment GC except for the segment GX, applying a light-transmissive color RB of a second color (e.g. red) in another area corresponding to an area in fourth image segment GD except for segment GX (e.g. applying a colorless/clear light-transmissive color RC in segment GX), a third image segment GC and a fourth image segment GD may be formed. Peripheral segment GP surrounding third image segment GC and fourth image segment GD may be formed by applying an opaque color RE or a light-transmissive coating of a color other than the first color and the second color.

According to an exemplary embodiment as shown schematically in FIG. 11B, when light source LS emits visible light of the same color as the first color (e.g. blue) of light-transmissive color RA, light LA may pass through third image segment GC including segment GX, but it may not pass through fourth image segment GF of second color RB. An illuminated image visible on the surface of the vehicle interior component shown schematically as image VA may correspond to third image segment GC and segment GX.

According to an exemplary embodiment as shown schematically in FIG. 12B, when light source LS emits visible light of the same color as the second color (e.g. red) of light-transmissive color RB, light LB may pass through fourth image segment GD, but it may not pass through third image segment GC of first color RA. An illuminated image visible on the surface of the vehicle interior component shown schematically as image VI may correspond to fourth image segment GD and segment GX.

Referring to FIGS. 17A, 17D, 18F and 19F, different images may be shown on the surface of the vehicle interior component when the vehicle interior component is illuminated by visible light of different colors. When the light source does not emit light, no image is displayed on the surface of the vehicle interior component (as shown schematically in FIG. 17A). When the light source emits visible light of the first color, an image corresponding to one of multiple image segments (numeral "1" shown schematically in FIG. 17D) shows on the surface of the vehicle interior component, and the image appears in the first color. When the light source emits visible light of the second color, an image corresponding to another image segment of the multiple image segments (numeral "2" shown schematically in FIG. 17D) shows on the surface of the vehicle interior component, and the image appears in the second color. Multiple image segments may at least partially overlap; the numerals "1" and "2" are displayed schematically in FIG. 17D; in actual use, when the numeral "1" is displayed, the numeral "2" is not displayed and vice versa. By changing the color of visible light emitted by the light source, the color and shape of the image displayed on the surface of the vehicle interior component may be changed. By changing the visible light emitted from the light source, the color and position of the image displayed on the surface of the vehicle interior component may change (numeral "2" with a position gradually shifted as shown schematically in FIG. 18F) or the color, position and dimension of the image may change (numeral "2" with a dimension gradually reduced as shown in FIG. 8D). The images may comprise images, characters, logos, or any form of a display.

By changing the number of the coatings, the color of the coatings, and the image segment on each coating, the vehicle interior component may display a different image as the color of the visible light emitted by the light source changes. Image layer YS may be formed by at least one of a transparent film, a translucent film, adhesive film, adhesive tape, a coating.

A surface of the vehicle interior component may comprise a decorative coating configured to transmit visible light of various colors. The decorative coating may comprise a single layer and may comprise at least one of a decorative color of beige, real wood color, marble color, etc. Light transmittance of the decorative coating may be adjusted by adjusting the thickness of the decorative coating or the concentration of color additives such as pigments or dyes in the coating. When image layer YS is arranged on the front surface of translucent cover TF, the decorative coating may be applied on the front surface of image layer YS; when image layer YS is arranged on the back surface of translucent cover TF or lining SB, the decorative coating may be applied on the front surface of translucent cover TF.

In order to provide a soft-touch feel, the vehicle interior component may comprise a buffer layer. The buffer layer may comprise one or more of foam, three-dimensional mesh, fabric, high-compressible rubber/elastomer/gel and porous foam materials.

The vehicle interior component may comprise a sensor at any position of a surface of the translucent cover; a surface of the lining; a front surface or a back surface of the base; a position integrated with the light source. The sensor may comprise a pressure-sensitive sensor, a capacitive sensor, a sound sensor or a temperature sensor; the vehicle interior component may be patterned and may vary in response to the sensed feedback of various environmental signals (e.g. pressure, voltage, sound, temperature, etc.).

Any two of the translucent cover, the image layer, the base, the lining, the buffer layer, the diffuser and the light source may be coupled by one of bonding, welding, clamping and screw connection.

Exemplary Embodiments—D

According to an exemplary embodiment, a vehicle interior component may comprise a cover comprising an exterior surface and an underside, a composite layer on the underside of the cover, and a light source configured to provide light at a first visible color and light at a second visible color. The composite layer may comprise a first segment and a second segment and a transparent segment. The first segment and the second segment and the transparent segment may be light-transmissive. When light at the first visible color is provided by the light source a first image may be transmitted through the first segment and the transparent segment and presented at the exterior surface of the cover. When light at the second visible color is provided by the light source a second image may be transmitted through the second segment and the transparent segment and presented at the exterior surface of the cover. Light at the first visible color may comprise light at a first wavelength comprising a first visible color so that the first image is presented substantially in the first visible color; light at the second visible color may comprise light at a second wavelength comprising a second visible color so that the second image is presented substantially in the second visible color.

According to an exemplary embodiment, a vehicle interior component may comprise a cover comprising an exterior surface and an underside, a composite layer on the underside of the cover, and a light source configured to provide light at a first visible color and light at a second visible color. The composite layer may comprise a first layer comprising a first segment and a second segment and a second layer comprising a first segment and a second segment. The first segment of the first layer and the first segment of the second layer may at least partially overlap in a first section. The second segment of the first layer and the second segment of the second layer may at least partially overlap in a second section. The first segment of the first layer and the second segment of the second layer may at least partially overlap in a third section. The first segment and the second segment of the first layer may be light-transmissive. The first segment and the second segment of the second layer may be light-transmissive. When light at the first visible color is provided by the light source a first image may be presented in the second section and the third section and transmitted to present the first image on the cover. When light at the second visible color is provided by the light source a second image may be presented in the first section and the third section and transmitted to present the second image on the cover. The second segment of the first layer may comprise a light-transmissive segment having a first color; the first segment of the first layer may comprise a transparent segment. The first segment of the second layer may comprise a light-transmissive segment having a second color; the second segment of the second layer may comprise a transparent segment. Light at the first visible color provided by the light source may be substantially obstructed by the first segment of the second layer of the composite layer; light at the second visible color provided by the light source may be substantially obstructed by the second segment of the first layer of the composite layer. The cover may comprise a display region; the composite structure may be configured so that the first image is presented in the display region of the cover when the light source transmits light in the first visible color and the second image is presented in the display region of the cover when the light source transmits light at the second visible color. The component may comprise a lining between the light source and the layer structure.

According to an exemplary embodiment, a vehicle interior component may comprise a composite structure comprising a cover and a layer structure and a light source configured to provide light at a first wavelength and light at a second wavelength. The cover may comprise an exterior surface and an underside. The layer structure may comprise a first layer comprising a first segment and a second segment and a second layer comprising a first segment and a second segment. The first segment of the first layer and the first segment of the second layer may at least partially overlap in a first section of the layer structure. The second segment of the first layer and the second segment of the second layer may at least partially overlap in a second section of the layer structure. The first segment of the first layer and the second segment of the second layer may at least partially overlap in a third section of the layer structure. When light at the first wavelength is provided by the light source a first image may be transmitted through the second section and the third section of the layer structure and presented at the exterior surface of the cover. When light at the second wavelength is provided by the light source a second image may be transmitted through the first section and the third section of the layer structure and presented at the exterior surface of the cover. The first wavelength may comprise a first visible color so that the first image is presented substantially in the first visible color; the second wavelength may comprise a second visible color so that the second image is presented substantially in the second visible color. The exterior surface of the cover may comprise a display region; the layer structure may be configured so that the first image is presented in the display region of the cover when the light source transmits light at the first wavelength and the second image is presented in the display region of the cover when the light source transmits light at the second wavelength. The layer structure may comprise at least one of (a) a coating on an underside of the cover; (b) a film; (c) a two-layer coating; (d) a two-layer film. The second segment of the first layer may comprise a light-transmissive segment having a first color; the first segment of the second layer may comprise a light-transmissive segment having the second color. The second segment of the second layer may comprise a transparent segment configured to transmit light to the cover at the first wavelength and at the second wavelength; the first segment of the first layer may comprise a transparent segment configured to transmit light to the cover at the first wavelength and at the second wavelength. When light at the first visible color is provided by the light source a first image may be presented in the second section and the third section; when light at the second visible color is provided by the light source a second image may be presented in the first section and the third section. The first layer of the layer structure may be provided on the underside of the cover and the second layer of the layer structure may be provided on the underside of the first layer of the layer structure.

According to an exemplary embodiment, a vehicle interior trim may comprise a translucent surface layer and a pattern layer. The pattern layer may comprise multiple graphic areas characterized in that a graphic that corresponds to at least one graphic area among the multiple graphic areas may only be shown on a viewable surface of the vehicle interior trim when the vehicle interior trim is illuminated by visible backlight emitted by a light source. The graphic shown on the viewable surface of the vehicle interior trim may change in response to changes to a color of the visible light. The multiple graphic areas of the pattern layer may at least partially overlap to form an overlapping area. When the pattern layer is one layer, the overlapping area of the multiple graphic areas may be disposed to be colorless and transparent or translucent, other areas of the multiple graphic areas may only allow light corresponding to a color of the graphic area to pass through, and peripheral areas surrounding the multiple graphic areas may not allow the light to pass through. When the pattern layer is of multiple layers, the multiple graphic areas may be respectively located at different pattern layers, the multiple graphic areas may be disposed to be colorless and transparent or translucent, and peripheral areas of each of the pattern layers surrounding the multiple graphic areas may only allow light corresponding to a color of the peripheral area to pass through. A change of the graphic may comprise a change in a combination of any one or more of color, shape, dimension and position of the graphic. The visible light may be provided by one LED lamp or lamplight module that provides polychromatic visible light. The translucent surface layer may comprise any one or more materials of polyurethanes, polyvinyl chlorides, polystyrenes, polyolefins, polyester elastomers, polyamides, and silicone resins. The vehicle interior trim may comprise a base layer; at least a partial area of the base layer may comprise a transparent or translucent material, and the partial area covering the multiple graphic areas of the pattern layer. The at least partial area of the base layer may be connected to other areas of the base layer by one of insert injection molding, screws, welding, gluing and clamping. The visible light may be disposed to emit from beneath the base layer when the base layer is transparent or translucent, or at least the partial area of the base layer is transparent or translucent. The transparent or translucent material may comprise a combination of one or more of polycarbonate, polypropylene, polymethyl methacrylate, polystyrene, polyester and polysulfone. The pattern layer may comprise a combination of any one or more of transparent or translucent film, painting, ink, adhesive tape and adhesive film. The pattern layer may be formed by any one process of screen printing, hot stamping, spraying, and gluing.

As indicated schematically according to an exemplary embodiment in FIGS. 2, 3A-3F, 9A-9D, 13A-13D, 17A-17D, 18A-18F and 19A-19F, variations in the visual effect/image presented in the display region D of the exterior surface of the cover TF of the component C for the vehicle interior may be provided by arrangement of the position/overlap and light transmissivity/tint/opacity of light segments within the layer structure/composite layer YX of the display region D and by corresponding selection of the wavelength/color of the light transmitted by the light source LS. See also FIG. 4. As indicated schematically in FIGS. 11A-11B, 12A-12B, 15A-15B and 16A-16B, the color/tint of segments of the layer structure YX may be coordinated with the wavelength/color of light provide by the light source LS; certain segments may transmit light at a first wavelength and obstruct light at a second wavelength; certain segments may transmit light at the second wavelength and obstruct light at the first wavelength; certain segments may transmit light at a first wavelength and transmit light at a second wavelength (e.g. light-transmissive transparent/translucent); certain segments may be transparent (e.g. substantially transparent/clear, effectively colorless, translucent, etc.); certain segments may be substantially opaque (e.g. obstruct light at first wavelength and at second wavelength). See also FIGS. 3A-3F, 9A-9D, 13A-13D, 17A-17D, 18A-18F and 19A-19F. As indicated schematically in FIGS. 3A-3F, 4, 5, 6, 7, 8, 9A-9D, 10B, 13A-13D, 14B, 17A-17D, 18A-18F and 19A-19F, the segments of the layer structure YX may be arranged in a pattern to present a first image/visual effect when illuminated by light at the first wavelength and a second image/visual effect when illuminated by light at the second wavelength. Compare FIGS. 9B, 13B and 17B with FIGS. 9C, 13C and 17C. As indicated schematically in FIGS. 10B, 11B, 12B and 14B, 15B and 16B, transparent/translucent segments of the layer structure may be clear/colorless and/or otherwise formed (e.g. with tint, color, colorless, clear, translucent, light-transmissive, light filter, etc.) to transmit light at the first wavelength and at the second wavelength. See also FIGS. 11A, 12A, 13A-13D and 15A, 16A and 17A-17D.

REFERENCE SYMBOL LIST

| ELEMENT, PART OR COMPONENT | REFERENCE SYMBOL |
|---|---|
| vehicle | V |
| interior | I |
| trim/component | C |
| display region | D |
| base | B |
| cover | TF |
| lining | SB |
| layer/composite | YS |
| layer/image layer | YA |
| layer/image layer | YB |
| Segment | GX |
| Segment | GA |
| Segment | GB |
| Segment | GC |
| Segment | GD |
| Segment | GE |
| Segment | GF |
| Segment | GP |
| color/colorant (of segment) | RA |
| color/colorant (of segment) | RB |
| color/colorant (of segment) | RC |
| color/colorant (of segment) | RE |
| color/colorant (of segment) | RT |
| image/graphic | IM |
| image/visual effect of display element | VA |
| image/visual effect of display element | VI |
| image/visual effect of display element | VF |
| image/visual effect of display element | VY |
| light source/light panel (LED) | LS |
| light (wavelength/visible color) | LA |
| light (wavelength/visible color) | LB |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
a cover comprising an exterior surface and an underside;
a composite layer on the underside of the cover; and
a light source configured to provide light at a first visible color and light at a second visible color;
wherein the composite layer comprises a first segment and a second segment and a transparent segment;
wherein the first segment and the second segment and the transparent segment are light-transmissive;
wherein when light at the first visible color is provided by the light source a first image is transmitted through the first segment and the transparent segment and presented at the exterior surface of the cover;
wherein when light at the second visible color is provided by the light source a second image is transmitted through the second segment and the transparent segment and presented at the exterior surface of the cover.

2. The component of claim 1 wherein light at the first visible color comprises light at a first wavelength comprising a first visible color so that the first image is presented substantially in the first visible color; wherein light at the second visible color comprises light at a second wavelength comprising a second visible color so that the second image is presented substantially in the second visible color.

3. A vehicle interior component comprising:
a cover comprising an exterior surface and an underside;

a composite layer on the underside of the cover; and
a light source configured to provide light at a first visible color and light at a second visible color;
wherein the composite layer comprises a first layer comprising a first segment and a second segment and a second layer comprising a first segment and a second segment;
wherein the first segment of the first layer and the first segment of the second layer at least partially overlap in a first section;
wherein the second segment of the first layer and the second segment of the second layer at least partially overlap in a second section;
wherein the first segment of the first layer and the second segment of the second layer at least partially overlap in a third section;
wherein the first segment and the second segment of the first layer are light-transmissive;
wherein the first segment and the second segment of the second layer are light-transmissive;
wherein when light at the first visible color is provided by the light source a first image is presented in the second section and the third section and transmitted to present the first image on the cover;
wherein when light at the second visible color is provided by the light source a second image is presented in the first section and the third section and transmitted to present the second image on the cover.

4. The component of claim 3 wherein the second segment of the first layer comprises a light-transmissive segment having a first color; wherein the first segment of the first layer comprises a transparent segment.

5. The component of claim 3 wherein the first segment of the second layer comprises a light-transmissive segment having a second color; wherein the second segment of the second layer comprises a transparent segment.

6. The component of claim 3 wherein light at the first visible color provided by the light source is substantially obstructed by the first segment of the second layer of the composite layer; wherein light at the second visible color provided by the light source is substantially obstructed by the second segment of the first layer of the composite layer.

7. The component of claim 3 wherein the cover comprises a display region; wherein the composite layer is configured so that the first image is presented in the display region of the cover when the light source transmits light in the first visible color and the second image is presented in the display region of the cover when the light source transmits light at the second visible color.

8. The component of claim 3 wherein the first segment of the first layer comprises a transparent segment; wherein the second segment of the second layer comprises a transparent segment; wherein each transparent segment comprises at least one of (a) a light-transmissive segment configured to transmit light at the first visible color and at the second visible color; (b) a light-transmissive segment with color configured to transmit light at the first visible color and at the second visible color; (c) a substantially clear segment; (d) a substantially colorless segment; (e) a substantially translucent light-transmissive segment.

9. The component of claim 3 further comprising a substrate comprising a lining between the light source and the composite layer.

10. A vehicle interior component comprising:
a composite structure comprising a cover and a layer structure;
a light source configured to provide light at a first wavelength and light at a second wavelength;
wherein the cover comprises an exterior surface and an underside;
wherein the layer structure comprises a first layer comprising a first segment and a second segment and a second layer comprising a first segment and a second segment;
wherein the first segment of the first layer and the first segment of the second layer at least partially overlap in a first section of the layer structure;
wherein the second segment of the first layer and the second segment of the second layer at least partially overlap in a second section of the layer structure;
wherein the first segment of the first layer and the second segment of the second layer at least partially overlap in a third section of the layer structure;
wherein when light at the first wavelength is provided by the light source a first image is transmitted through the second section and the third section of the layer structure and presented at the exterior surface of the cover;
wherein when light at the second wavelength is provided by the light source a second image is transmitted through the first section and the third section of the layer structure and presented at the exterior surface of the cover.

11. The component of claim 10 wherein the first wavelength comprises a first visible color so that the first image is presented substantially in the first visible color; wherein the second wavelength comprises a second visible color so that the second image is presented substantially in the second visible color.

12. The component of claim 10 wherein the exterior surface of the cover comprises a display region; wherein the layer structure is configured so that the first image is presented in the display region of the cover when the light source transmits light at the first wavelength and the second image is presented in the display region of the cover when the light source transmits light at the second wavelength.

13. The component of claim 10 wherein the layer structure comprises at least one of (a) a coating on an underside of the cover; (b) a film; (c) a two-layer coating; (d) a two-layer film.

14. The component of claim 10 wherein the second segment of the first layer comprises a light-transmissive segment having a first color; wherein the first segment of the first layer comprises a transparent segment configured to transmit light to the cover at the first wavelength and at the second wavelength.

15. The component of claim 14 wherein the second segment of the second layer comprises a transparent segment configured to transmit light to the cover at the first wavelength and at the second wavelength; wherein the first segment of the first layer comprises a light-transmissive segment having the second color.

16. The component of claim 14 wherein when light at the first visible color is provided by the light source a first image is presented in the first section; wherein when light at the second visible color is provided by the light source a second image is presented in the second section.

17. The component of claim 10 wherein the first layer of the layer structure is provided on the underside of the cover and the second layer of the layer structure is provided on an underside of the first layer of the layer structure.

18. The component of claim 10 wherein the first segment of the first layer comprises a transparent segment; wherein the second segment of the second layer comprises a transparent segment; wherein each transparent segment comprises at least one of (a) a light-transmissive segment configured to transmit light at the first visible color and at the second visible color; (b) a light-transmissive segment with color configured to transmit light at the first visible color and at the second visible color; (c) a substantially clear segment; (d) a substantially colorless segment; (e) a substantially translucent light-transmissive segment.

19. The component of claim 10 wherein the first layer comprises an opaque segment.

20. The component of claim 10 wherein the light source comprises at least one LED.

\* \* \* \* \*